United States Patent
Park et al.

(10) Patent No.: US 12,205,576 B2
(45) Date of Patent: Jan. 21, 2025

(54) ELECTRONIC APPARATUS FOR SPEECH RECOGNITION, AND CONTROLLING METHOD THEREOF

(71) Applicant: SAMSUNG ELECTRONICS CO., LTD., Suwon-si (KR)

(72) Inventors: Jinhwan Park, Suwon-si (KR); Sungsoo Kim, Suwon-si (KR); Sichen Jin, Suwon-si (KR); Junmo Park, Suwon-si (KR); Dhairya Sandhyana, Suwon-si (KR); Changwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 17/968,517

(22) Filed: Oct. 18, 2022

(65) Prior Publication Data

US 2023/0130396 A1 Apr. 27, 2023

Related U.S. Application Data

(63) Continuation of application No. PCT/KR2022/013533, filed on Sep. 8, 2022.

(30) Foreign Application Priority Data

Oct. 21, 2021 (KR) .................... 10-2021-0141388
Dec. 21, 2021 (KR) .................... 10-2021-0184153

(51) Int. Cl.
*G10L 15/16* (2006.01)
*G10L 15/22* (2006.01)

(52) U.S. Cl.
CPC .............. *G10L 15/16* (2013.01); *G10L 15/22* (2013.01); *G10L 2015/223* (2013.01)

(58) Field of Classification Search
USPC .................................................. 704/1–504
See application file for complete search history.

(56) References Cited

U.S. PATENT DOCUMENTS

| 9,984,682 B1 | 5/2018 | Tao et al. |
| 10,770,064 B1 | 9/2020 | Graves |

(Continued)

FOREIGN PATENT DOCUMENTS

| CN | 110634469 A | 12/2019 |
| CN | 110675859 A | 1/2020 |
| KR | 10-2017-0119152 A | 10/2017 |

(Continued)

OTHER PUBLICATIONS

Rami Botros et al., "Tied & Reduced RNN-T Decoder", Proceedings of Interspeech 2021, Aug. 30, 2021, pp. 4563-4567, XP055860087, DOI: 10.21437/Interspeech.2021-212.

(Continued)

*Primary Examiner* — Marcus T Riley
(74) *Attorney, Agent, or Firm* — Sughrue Mion, PLLC

(57) ABSTRACT

An electronic apparatus includes a memory storing a speech recognition model and first recognition information corresponding to a first user voice obtained through the speech recognition model, the speech recognition model including a first network, a second network, and a third network; and a processor configured to: obtain a first vector by inputting voice data corresponding to a second user voice to the first network, obtain a second vector by inputting the first recognition information to the second network which generates a vector based on first weight information, and obtain second recognition information corresponding to the second user voice by inputting the first vector and the second vector to the third network which generates recognition information based on second weight information, wherein at least a part of the second weight information is the same as the first weight information.

15 Claims, 18 Drawing Sheets

(56) References Cited

U.S. PATENT DOCUMENTS

| | | | |
|---|---|---|---|
| 10,978,048 B2* | 4/2021 | Lee | G10L 15/22 |
| 11,074,909 B2 | 7/2021 | Lee et al. | |
| 12,014,725 B2* | 6/2024 | Huang | G10L 15/22 |
| 2018/0047389 A1* | 2/2018 | Song | G10L 15/16 |
| 2018/0061397 A1 | 3/2018 | Huang et al. | |
| 2018/0342237 A1* | 11/2018 | Lee | G10L 15/26 |
| 2019/0156819 A1* | 5/2019 | Shafran | G10L 15/02 |
| 2020/0013407 A1* | 1/2020 | Chae | G06F 3/167 |
| 2020/0211528 A1 | 7/2020 | Lee | |
| 2020/0410992 A1* | 12/2020 | Lee | G10L 15/197 |
| 2021/0312905 A1 | 10/2021 | Zhao et al. | |
| 2022/0122622 A1* | 4/2022 | Narayanan | G10L 25/30 |
| 2022/0310062 A1* | 9/2022 | Sainath | G06N 3/088 |
| 2023/0096805 A1* | 3/2023 | Kim | G10L 15/1815 704/232 |
| 2023/0096821 A1* | 3/2023 | Huang | G10L 15/16 704/235 |
| 2023/0130396 A1* | 4/2023 | Park | G10L 15/063 704/232 |
| 2024/0290323 A1* | 8/2024 | Huang | G10L 15/063 |

FOREIGN PATENT DOCUMENTS

| | | |
|---|---|---|
| KR | 10-2018-0018031 A | 2/2018 |
| KR | 10-2020-0102308 A | 8/2020 |
| KR | 10-2167798 B1 | 10/2020 |
| KR | 10-2021-0001937 A | 1/2021 |
| WO | WO-2023055409 A1 * 4/2023 | G06N 3/02 |

OTHER PUBLICATIONS

Communication issued on Mar. 22, 2024 by the European Patent Office for European Patent Application No. 22883777.9.
Ashish Vaswani, et al., "Attention is all you need", 31st Conference on Neural Information Processing Systems (NIPS 2017), Dec. 2017, pp. 1-11.
Yanzhang He, et al., "Streaming End-To-End Speech Recognition For Mobile Devices", 2019 IEEE International Conference on Acoustics, Speech and Signal Processing (ICASSP), Nov. 15, 2018, Total 5 pages.
International Search Report (PCT/ISA/210) and Written Opinion (PCT/ISA/237) dated Dec. 22, 2022 issued by the International Searching Authority in International Application No. PCT/KR2022/013533.

* cited by examiner

<Input embedding>

<Output embedding>

ELECTRONIC APPARATUS FOR SPEECH RECOGNITION, AND CONTROLLING METHOD THEREOF

CROSS-REFERENCE TO RELATED APPLICATIONS

This application is a bypass continuation of International Application No. PCT/KR2022/013533, filed on Sep. 8, 2022, which is based on and claims priority to Korean Patent Application No. 10-2021-0141388, filed on Oct. 21, 2021 and Korean Patent Application No. 10-2021-0184153, filed on Dec. 21, 2021, in the Korean Intellectual Property Office, the disclosures of which are incorporated by reference herein in their entireties.

BACKGROUND

1. Field

The disclosure relates to an electronic apparatus and a control method thereof, and more specifically to an electronic apparatus for obtaining text information corresponding to a user voice based on a speech recognition model and a control method thereof.

2. Description of Related Art

Speech recognition is a process for converting an audio signal of speech uttered by a user into text information. An electronic apparatus for speech recognition transduces or otherwise converts an audio signal into a digital signal, and inputs the digital signal to a speech recognition model. The apparatus then obtains text information corresponding to the utterance of the user from the speech recognition model.

In order to train a speech recognition model to convert the digital signal to text information, a user's voice may be analyzed on the basis of prior recorded utterances, typically on the order of 2000 to 8000 words. The speech recognition model may develop and use a plurality of weights or parameters to analyze the utterances of the user.

If a space for storage of a preset word, weight, or parameter used in the speech recognition model is unavailable, the speech recognition model must instead be kept in a local or short-term memory. If there is limited memory for the speech recognition model, the processing speed may slow, possibly to impractical levels.

For example, when a speech recognition model is implemented as an on-device type stored in a terminal device (e.g., a smartphone) of a user, there may be a problem in that limitation of memory usage and storage space occurs, resulting in an inconvenient or even ineffectual speed of operation.

SUMMARY

Provided are an electronic apparatus in which different weight information used in a speech recognition model partially shares data, and a control method thereof.

According to an aspect of the disclosure, an electronic apparatus includes: a memory storing a speech recognition model and first recognition information corresponding to a first user voice obtained through the speech recognition model, the speech recognition model including a first network, a second network, and a third network; and a processor configured to: obtain a first vector by inputting second voice data corresponding to a second user voice to the first network, obtain a second vector by inputting the first recognition information to the second network of the speech recognition model which generates the second vector based on first weight information, and obtain second recognition information corresponding to the second user voice by inputting the first vector and the second vector to the third network which generates the second recognition information based on second weight information, wherein at least a part of the second weight information is the same as the first weight information.

The speech recognition model may be a recurrent neural network transducer (RNN-T) model.

The first network may be a transcription network, the second network may be a prediction network, and the third network may be a joint network.

The processor may be further configured to, based on receiving the second user voice, obtain a feature vector corresponding to the second user voice, and a first sub-network included in the first network may generate the first vector based on the feature vector.

The processor may be further configured to obtain a one-hot vector corresponding to the first recognition information, and a second sub-network included in the second network generates the second vector based on the one-hot vector and the first weight information.

A third sub-network included in the third network may generate a third vector based on the first vector and the second vector, and the third network generates the second recognition information based on the third vector and the second weight information.

The first weight information may include at least one first weight corresponding to a preset number of subwords, the second weight information may include the at least one first weight and at least one additional weight, the at least one first weight may be stored in a first area of the memory, and the at least one additional weight may be stored in a second area of the memory, and the processor may be further configured to use the at least one first weight stored in the first area and the at least one additional weight stored in the second area as the second weight information.

The at least one additional weight may be a weight used when no subword of the preset number of subwords corresponds to the second user voice, and a dimension of the at least one first weight may correspond to a dimension of the at least one additional weight.

The first weight information may be trained based on a first gradient indicating a change amount of a loss value according to the first weight information, a second gradient indicating a change amount of a loss value according to the second weight information, and a learning rate, and the second weight information may be determined based on the trained first weight information.

Each of the first weight information and the second weight information may be trained based on an average value of first sub-weight information and second sub-weight information, the first sub-weight information may be determined based on a first gradient indicating a change amount of a loss value according to the first weight information and a learning rate, and the second sub-weight information may be determined based on a second gradient indicating a change amount of a loss value according to the second weight information and the learning rate.

According to an aspect of the disclosure, a method of controlling an electronic apparatus storing a speech recognition model and first recognition information corresponding to a first user voice obtained through the speech recognition model, the speech recognition model including a first network, a second network, and a third network, includes: obtaining a first vector by inputting second voice data corresponding to a second user voice to the first network; obtaining a second vector by inputting the first recognition information to the second network which generates the second vector based on first weight information; and obtaining second recognition information corresponding to the second user voice by inputting the first vector and the second vector to the third network which generates the second recognition information based on second weight information, wherein at least a part of the second weight information is the same as the first weight information.

The speech recognition model may be a recurrent neural network transducer (RNN-T) model.

The first network may be a transcription network, the second network may be a prediction network, and the third network may be a joint network.

The obtaining the first vector may include, based on receiving the second user voice, obtaining a feature vector corresponding to the second user voice, and a first sub-network included in the first network may generate the first vector based on the feature vector.

The obtaining the second vector may include obtaining a one-hot vector corresponding to the first recognition information, and a second sub-network included in the second network may generate the second vector based on the one-hot vector and the first weight information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be arbitrarily selected, in which case it will be described in detail in the description of the corresponding disclosure. Thus, the terms used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being coupled to the second element through a third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor (not shown).

In the following description, a "user" may refer to a person using an electronic apparatus or an apparatus using an electronic apparatus (e.g., artificial intelligence electronic apparatus).

Various example embodiments will be described in greater detail below with reference to the accompanying drawings.

Figure 1:
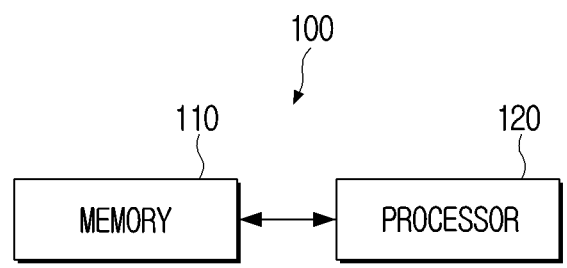
FIG. 1 is a block diagram illustrating an electronic apparatus according to an example embodiment of the disclosure.

FIG. 1 is a block diagram illustrating an electronic apparatus 100 according to an example embodiment of the disclosure.

Referring to FIG. 1, the electronic apparatus 100 may include a memory 110 and a processor 120.

The electronic apparatus 100 according to various embodiments may include, for example, at least one of a smartphone, a tablet personal computer (PC), a mobile phone, a desktop PC, a laptop PC, a personal digital assistant (PDA), or a portable multimedia player (PMP). In some embodiments, the electronic apparatus 100 may include at least one of, for example, a television, a digital video disk (DVD) player, and a media box (for example, SAMSUNG HOMESYNC™, APPLE TV™, or GOOGLE TV™).

The memory 110 may be implemented as an internal memory such as a read-only memory (ROM) (for example, electrically erasable programmable read-only memory (EEPROM)) and a random-access memory (RAM) or a memory separate from the processor 120. In this case, the memory 110 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

A memory embedded in the electronic apparatus 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

The processor 120 may perform overall control operations of the electronic apparatus 100, or may otherwise play a role to control overall operations of the electronic apparatus 100.

The processor 120 according to an embodiment may be implemented with at least one of a digital signal processor (DSP), a microprocessor, and a time controller (TCON). The embodiment is not limited thereto and may include at least one of a central processing unit (CPU), a micro controller unit (MCU), a micro processing unit (MPU), a controller, an application processor (AP), a graphics-processing unit (GPU), a communication processor (CP), and an advanced reduced instruction set computing (RISC) machine (ARM) processor or may be defined as a corresponding term. The processor 120 may be implemented in a system on chip (SoC) type or a large scale integration (LSI) type in which a processing algorithm is built therein or in a field programmable gate array (FPGA) type. The processor 120 may perform various functions by executing computer executable instructions stored in the memory 110.

Figure 2:
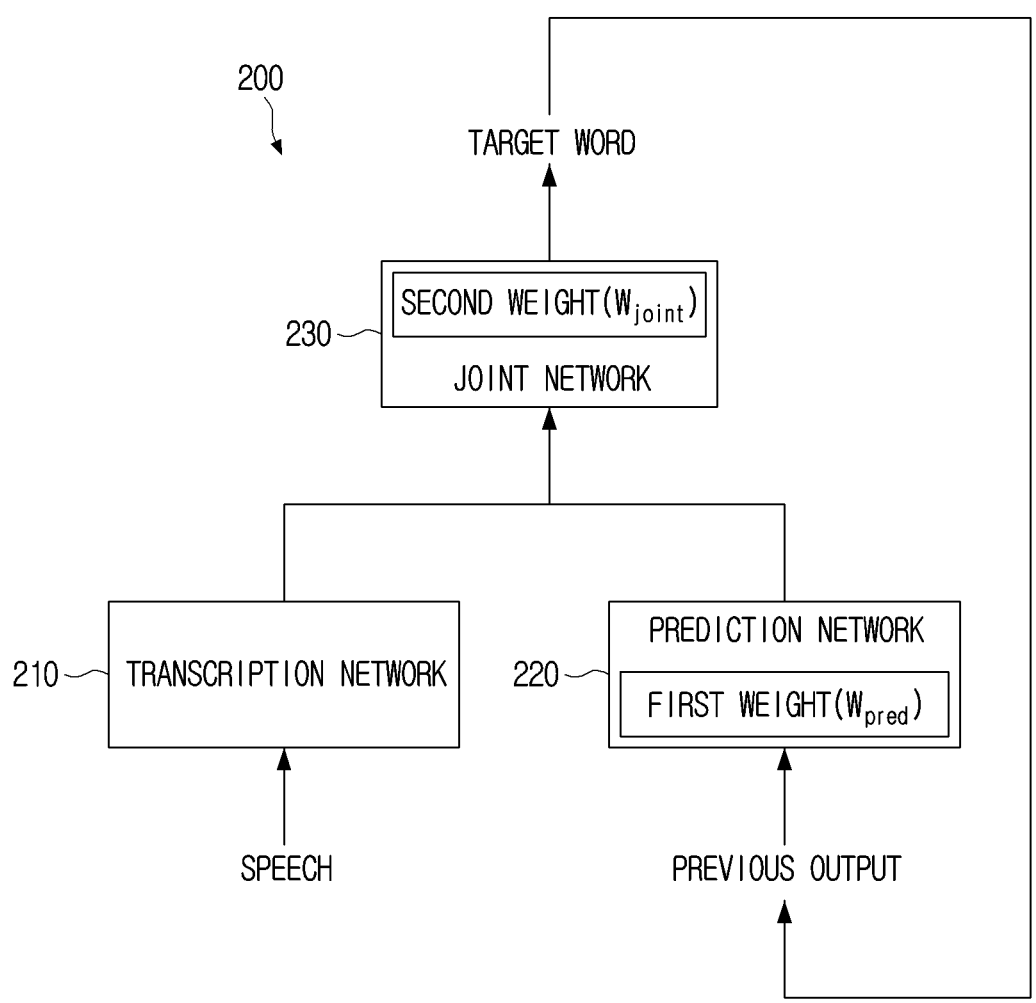
FIG. 2 is a diagram illustrating a speech recognition model including a plurality of networks, according to an embodiment of the disclosure.

The memory 110 may store a speech recognition model 200, such as illustrated in FIG. 2 according to an embodiment of the disclosure. The speech recognition model 200 includes a plurality of networks, such as neural networks. The speech recognition model 200 may include a first network 210, a second network 220, and a third network 230. The speech recognition model 200 may receive audio signals or other voice data corresponding to a user voice as input data, and may generate recognition information (or text information) corresponding to the user voice as output data. The recognition information may refer to text information corresponding to a user voice.

A detailed description of operation of the speech recognition model 200 will now be described.

The processor 120 may obtain one or more first audio signals corresponding to a first user voice. The processor 120 may obtain first recognition information corresponding to the first user voice through the speech recognition model 200. The processor 120 may input the first audio signals in digital format, or other first voice data corresponding to the first user voice, into the speech recognition model 200 as input data, and obtain first recognition information corresponding to the first user voice from the speech recognition model 200 as output data. The processor 120 may store the first recognition information in the memory 110. Accordingly, the memory 110 may store the first recognition information corresponding to the first user voice.

The processor 120 may obtain one or more second audio signals corresponding to a second user voice different from the first user voice. The processor 120 may obtain second recognition information corresponding to the second user voice through the speech recognition model 200. The processor 120 may input the second audio signals in digital format, or other second voice data corresponding to the second user voice, into the speech recognition model 200 as input data, and obtain second recognition information corresponding to the second user voice from the speech recognition model 200 as output data. The processor 120 may store the second recognition information in the memory 110. Accordingly, the memory 110 may store the second recognition information corresponding to the second user voice.

The processor 120 may obtain a first vector through the first network 210. The processor 120 may input the second audio signals or other second voice data to the first network 210, which generates, as output, the first vector. The first vector may be a hidden vector obtained based on a user voice (such as the second user voice). A detailed description related to the first vector will be later described with reference to Equation 211-1 of FIG. 3.

The processor 120 may obtain a second vector through the second network 220. The processor 120 may input the first recognition information corresponding to the first user voice to the second network 220, which generates, as output, the second vector. The second network 220 may include (or store) first weight information, and may generate the second vector based on the first recognition information and the first weight information. The second vector may be a hidden vector obtained based on a previous output result (such as the first recognition information). A detailed description related to the second vector will be later described with reference to Equation 221-1 and Equation 222-1 of FIG. 3.

The processor 120 may obtain the second recognition information corresponding to the second user voice through the third network 230. The processor 120 may input the first vector and the second vector to the third network 230, which generates, as output, the second recognition information. The third network 230 may generate a third vector based on the first vector and the second vector. The third vector may be a vector that combines the first vector and the second vector. The third network 230 may reference (or store) second weight information, and may generate the second recognition information based on the second weight information and the third vector. The operation of obtaining the second recognition information will be later described with reference to Equation 231 and Equation 232 of FIG. 3.

The first weight information and the second weight information may have information in common. For example, one or more weights included in the first weight information may also be included in the second weight information, such that at least a part of the second weight information is information in common with the first weight information.

The second weight information may further include additional information other than information in the first weight information. For example, the second weight information may include one or more weights included in the first weight information and also one or more additional weights not included in the first weight information.

The processor 120 may store a set of weights included in the first weight information in a first area of the memory 110 and store an additional set of weights in a second area of the memory 110. The processor 120 may use the set of weights stored in the first area of the memory 110 as the first weight information. The processor 120 may use the set of weights stored in the first area of the memory 110 and the additional set of weights stored in the second area of the memory 110 as second weight information. The storage space may be efficiently used by storing weights overlapping the first weight information and the second weight information in one area. The description related to the area of memory will be later described with reference to FIGS. 5-8.

The weight information may be written as parameter information or embedding. For example, the first weight information may be written as first parameter information or first embedding, and the second weight information may be written as second parameter information or second embedding.

In summary, the processor 120 may obtain the first vector by inputting the second user voice to the first network 210, obtain the second vector by inputting the first recognition information to the second network 220 which uses the first weight information, and obtain the second recognition information corresponding to the second user voice by inputting the first vector and the second vector to the third network 230 which uses the second weight information. At least some of the second weight information may be information in common with the first weight information.

The speech recognition model 200 may be a recurrent neural network transducer (RNN-T).

The RNN-T model may be a real-time speech recognition model performing a prediction operation in an intermediate process in which a user voice is continuously inputted. The RNN-T model may include a transcription network, a prediction network, and a joint network.

The transcription network may obtain a vector corresponding to real-time user voice input. The prediction network may obtain a vector corresponding to a previous user voice. The joint network may combine the vector output from the transfer network and the vector output from the prediction network.

The first network 210 may be the transcription network, the second network 220 may be the prediction network, and the third network 230 may be the joint network.

When the second user voice is received in the form of one or more audio signals, the processor 120 may generate a feature vector corresponding to the second user voice, and include the feature vector in the second voice data provided as input to the first network 210. A first sub-network included in the first network 210 then generates as output a first vector, based on the feature vector.

The processor 120 may vectorize the one or more audio signals of the second user voice to generate the feature vector. The processor 120 may generate the feature vector by using a Mel-filter bank or Mel-Frequency Cepstral Coefficients (MFCC), a Spectrogram, and the like.

The processor 120 may input the feature vector corresponding to the second user voice to the first sub-network to obtain a first vector. The first sub-network may convert the feature vector to a hidden vector. The first vector may be a hidden vector. The processor 120 may obtain the first vector as output of the first network 210. More specifically, the processor 120 may obtain the first vector as output of the first sub-network.

Figure 3:
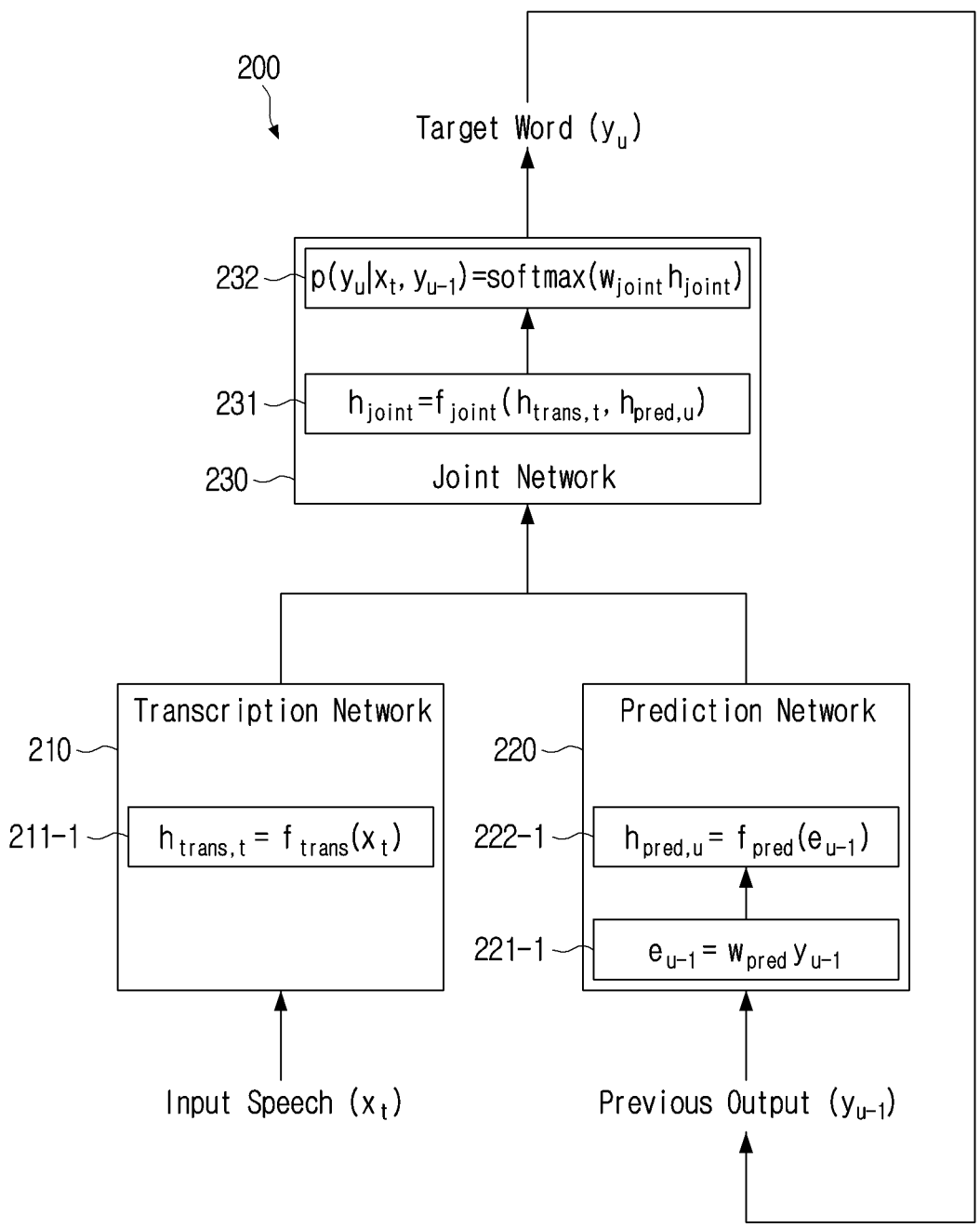
FIG. 3 is a diagram illustrating a speech recognition model for obtaining recognition information based on a previous output value, according to an embodiment of the disclosure.

An embodiment of the generation of the first vector may be described by Equation 211-1 of FIG. 3. In FIG. 3, the feature vector is indicated by "X_t", the first sub-network is indicated by "f_trans", and the first vector is indicated by "h_trans,t".

The processor 120 may obtain a one-hot vector corresponding to the first recognition information, and provide the one-hot vector as input to the second network 220. A second sub-network included in the second network 220 then generates as output a second vector, based on the one-hot vector and first weight information.

The processor 120 may obtain first recognition information corresponding to the first user voice (previous user voice) and obtain a one-hot vector corresponding to the first recognition information. A one-hot vector is a vector of binary values—that is, consisting of zeros ("0") and ones ("1")—where a sum of the values is 1. As such, the one-hot vector includes a plurality of values of "0" and one value of "1".

The second network 220 may include the first weight information. For example, the second network 220 may refer to the first weight information in its operation. The first weight information may be input embedding. The second network 220 may include a second sub-network. The second sub-network may convert an intermediate vector (or embedding vector) corresponding to the first recognition information into a hidden vector. The processor 120 may obtain a second vector as output of the second network 220. More specifically, the processor 120 may obtain the second vector as output of the second sub-network.

An embodiment of the generation of the second vector may be described by Equation 221-1 and Equation 222-1 of FIG. 3. In FIG. 3, the one-hot vector corresponding to the first recognition information is indicated by "y_u-1", the first weight information is indicated by "W_pred", the intermediate vector is indicated by "e_u-1", the second sub-network is indicated by "f_pred", and the second vector is indicated by "h_pred,u".

The processor 120 may obtain a third vector and the second recognition information both as output of the third network 230.

The third network 230 may include a third sub-network. The third sub-network may generate, as output, the third vector by combining the first vector generated by the first network 210 and the second vector generated by the second network 220. The third vector may be a hidden vector.

The third network 230 may include second weight information. For example, the third network 230 may refer to the second weight information in its operation. The second weight information may be output embedding. The third network 230 may generate the second recognition information based on the second weight information and the third vector. The third network 230 may multiply the second weight information and the third vector and normalize the multiplied value using a softmax function, and generate the second recognition information based on the normalized value.

An embodiment of the generation of the second recognition information may be described by Equation 231 and Equation 232 of FIG. 3. In FIG. 3, the third sub-network is indicated by "f_joint", the second weight information is indicated by "W_joint", and the third vector is indicated by "h_joint".

The first weight information may include at least one weight corresponding to a preset number of subwords, and the second weight information may include each weight included in the first weight information and at least one additional weight.

A "subword" may refer to a preset word assumed by a voice uttered by a user. The subword may be different according to a speech recognition model.

The first weight information may include V weights corresponding to a predetermined number of subwords. Here, the V weights may be determined by a learning operation. The second weight information may include the V weights included in the first weight information and further include one or more additional weights.

Figure 8:
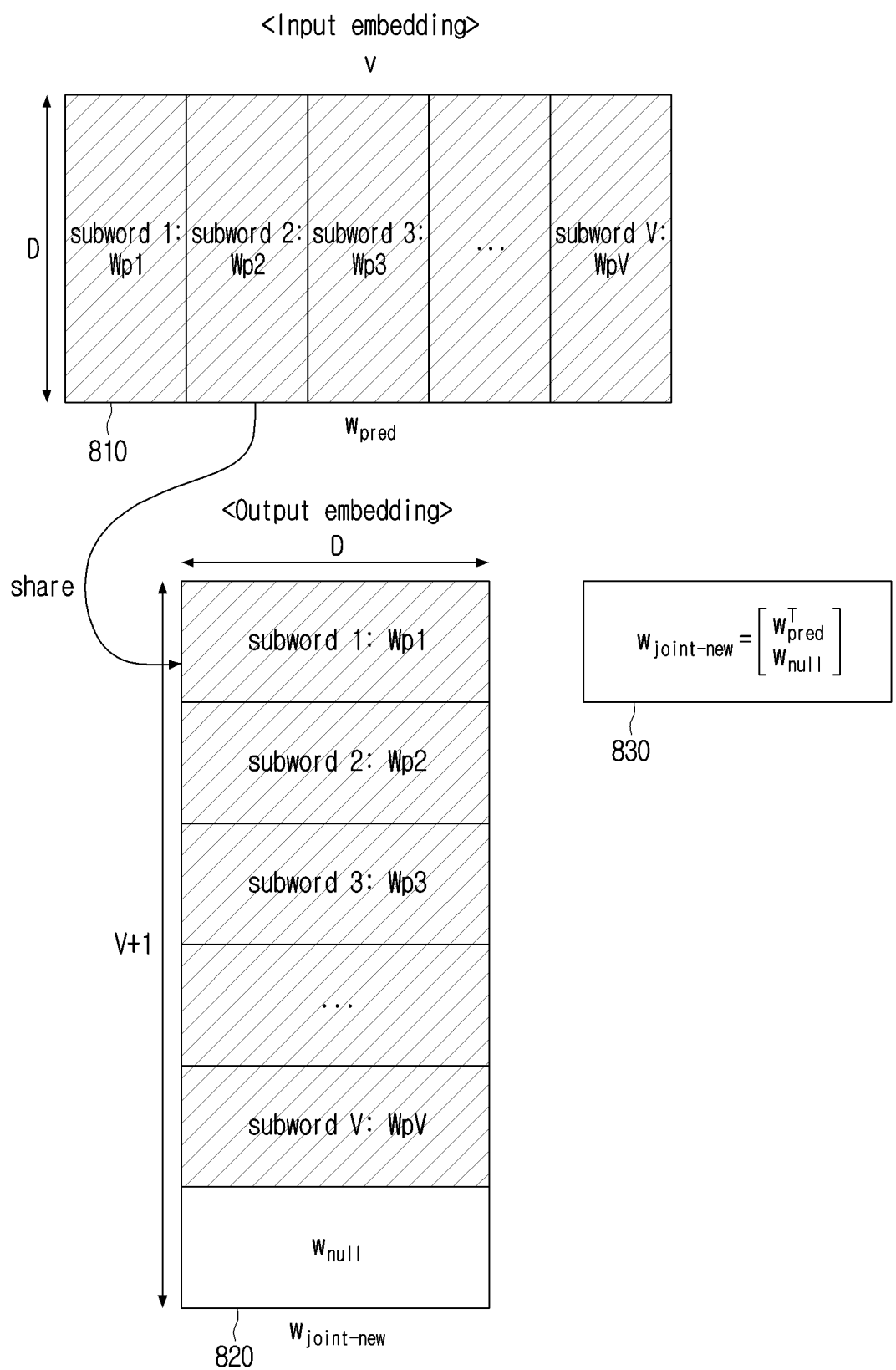
FIG. 8 is a diagram illustrating a weight information configuration in which the first weight information and the second weight information have weights in common, according to an embodiment of the disclosure.

For example, in FIG. 8, a set of first weights included in the first weight information are indicated by W_p1, W_p2, W_p3, . . . , W_pV, and an additional weight included in the second weight information is indicated by W_null.

The processor 120 may store the first weights included in the first weight information in the first area of the memory 110 and store the additional weights in the second area of the memory 110. The processor 120 may use the weights stored in the first area of the memory 110 as the first weight information. The processor 120 may use the weights stored in the first area of the memory 110 and the additional weights stored in the second area of the memory 110 as second weight information. A specific operation of storing a weight in the memory 110 will be later described with reference to FIGS. 5 to 8.

The additional weight may be a weight used when there is no subword corresponding to the second user voice. A dimension of each of the first weights may be the same as a dimension of the additional weight.

The additional weight (W_null) may be a weight which will be applied when the user voice does not correspond to any of V subwords.

When an audio signal representing speech of a user voice is received using the speech recognition model 200, the processor 120 may determine how much the user voice is similar to each of the preset V subwords. For example, the processor 120 may determine that the probability that the user voice corresponds to the first subword is p1, the probability of corresponding to the second subword is p2, . . . , and the probability of corresponding to the Vth subword is pV. The processor 120 may determine the subword having the highest probability value among p1 to pV as recognition information corresponding to the user voice.

The processor 120 may further check whether the highest probability value among p1 to pV is greater than or equal to a threshold value. If the highest probability value is greater than or equal to the threshold, the processor 120 may determine the subword having the highest probability value as recognition information corresponding to the user voice.

If the highest probability value is less than the threshold value, the processor 120 may determine that there is no subword corresponding to the user voice. If there is no subword corresponding to the user voice, the processor 120 may obtain recognition information corresponding to the user voice by using the additional weight (W_null).

The dimension of the weights included in the first weight information and the second weight information may be the same. The representation associated with the dimension of the weight is described in FIGS. 6 and 8.

The first weight information may be trained based on a first gradient indicating a change amount of a loss value according to the first weight information, a second gradient indicating a change amount of a loss value according to the second weight information, and a learning rate, and the second weight information may be determined based on the trained first weight information.

In an embodiment, the processor 120 may obtain a first gradient indicating the amount of change in the loss value according to the first weight information and a second gradient indicating the amount of change in the loss value according to the second weight information. In addition, the processor 120 may learn the first weight information based on the first gradient, the second gradient, and a learning rate. The processor 120 may determine the second weight information based on the trained first weight information.

Figure 14:
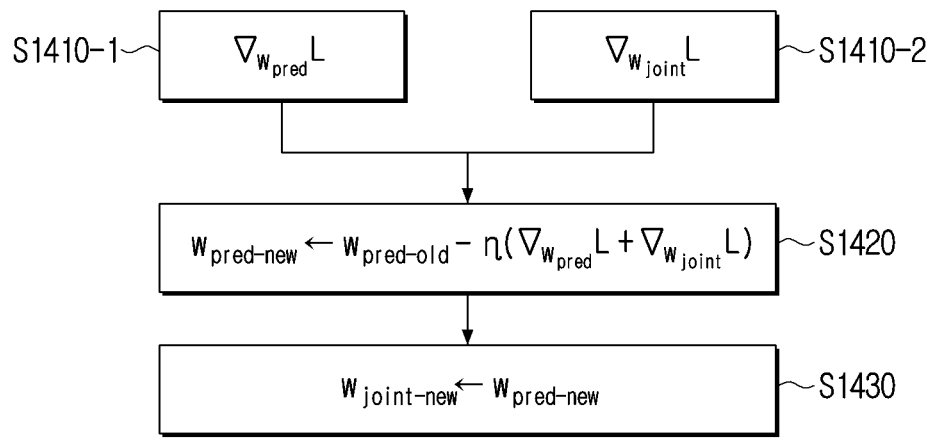
FIG. 14 is a diagram illustrating an operation of learning first weight information and second weight information based on a learning method, according to an embodiment of the disclosure.
Figure 15:
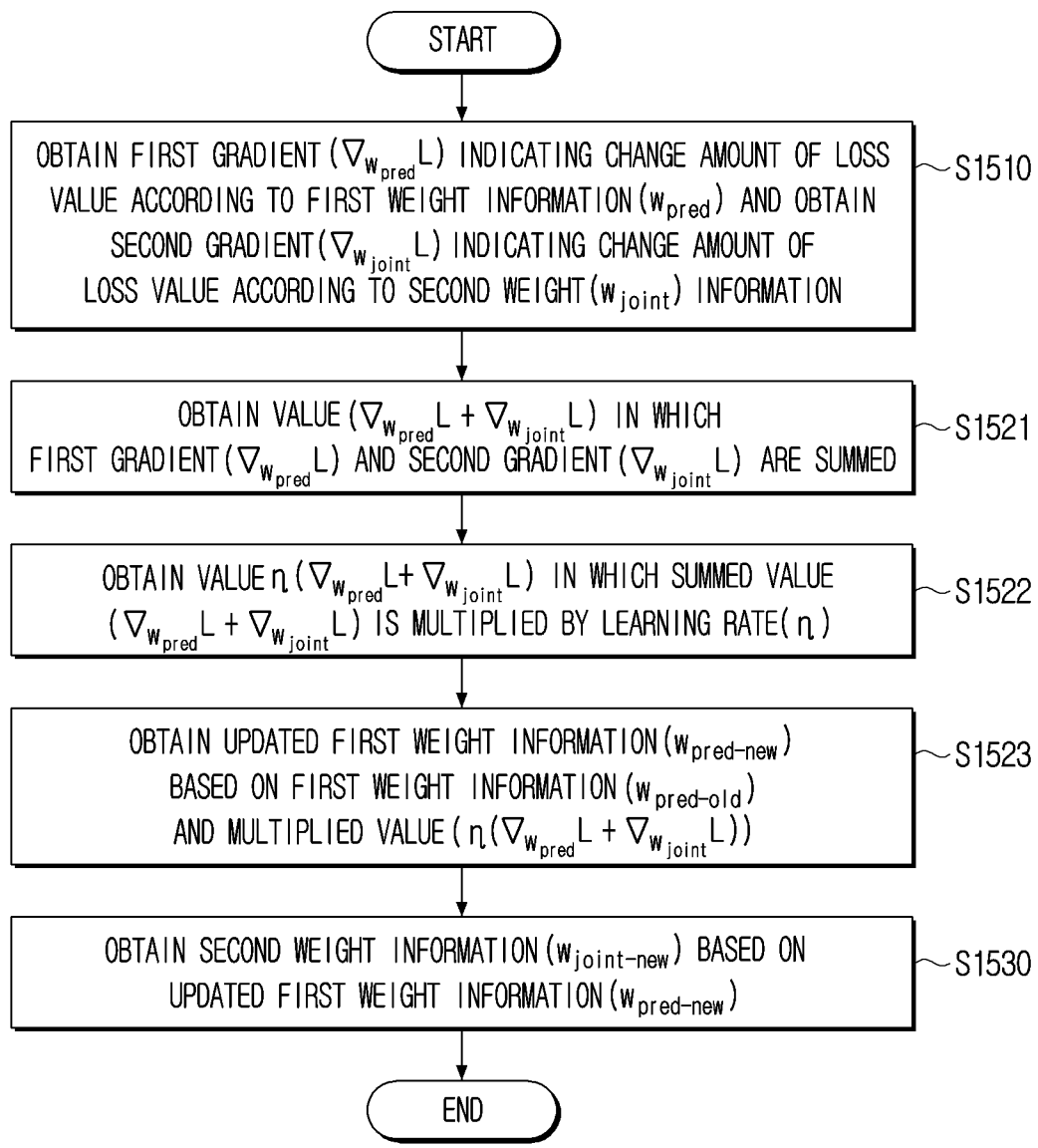
FIG. 15 is a flowchart illustrating an operation of learning first weight information and second weight information based on a learning method, according to an embodiment of the disclosure.

Specific operations related to the foregoing are described in FIGS. 14 and 15. In FIG. 14, the first gradient is indicated by "$\nabla_{W\_pred}L$", the second gradient is indicated by "$\nabla_{W\_joint}L$", the learning rate is indicated by η, the first weight information before the learning operation is performed is indicated by "W_pred-old", the first weight information after the learning operation has been performed is indicated by "W_pred-new", the second weight information before the learning operation is performed is indicated by "W_joint-old", and the second weight information after the learning operation has been performed is indicated by "W_joint-new".

The first weight information and the second weight information may be trained based on an average value of first sub-weight information and second sub-weight information, where a first sub-weight may be calculated based on the first gradient indicating a change amount of a loss value according to the first weight information and a learning rate, and a second sub-weight may be calculated based on the second gradient indicating a change amount of a loss value according to the second weight information and the learning rate.

In another embodiment, the processor 120 may obtain a first gradient indicating a variation of a loss value according to the first weight information and a second gradient indicating a variation of a loss value according to the second weight information. The processor 120 may obtain first sub-weight information based on the first gradient and the learning rate, and obtain second sub-weight information based on the second gradient and the learning rate. The processor 120 may learn the first weight information and the second weight information based on the average value of the first sub-weight information and the second sub-weight information.

Figure 16:
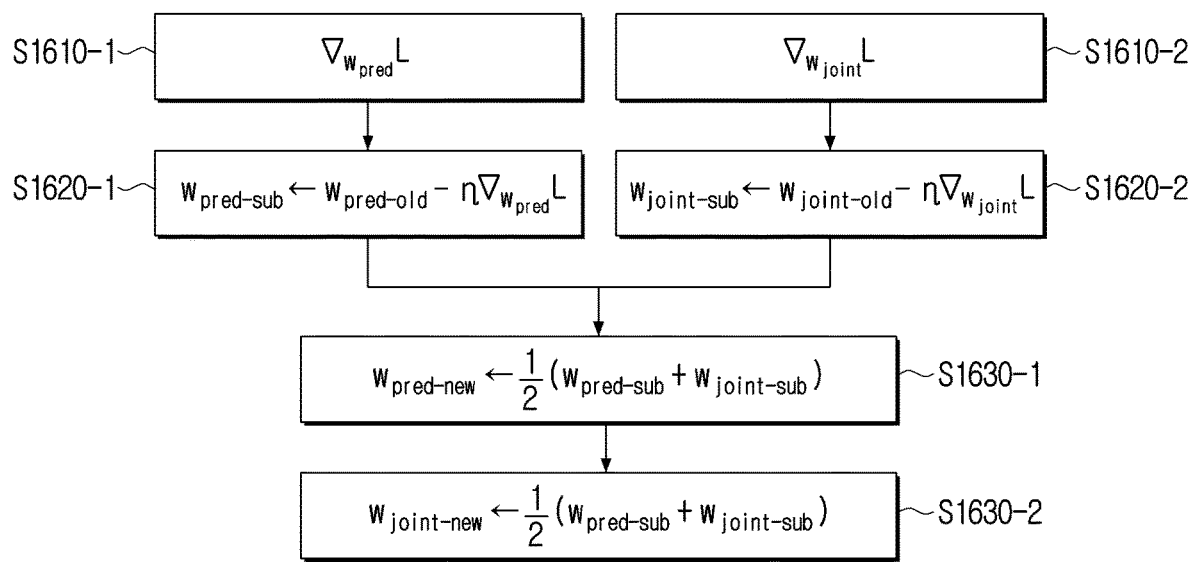
FIG. 16 is a diagram illustrating an operation of learning first weight information and second weight information based on a learning method, according to another embodiment of the disclosure.
Figure 17:
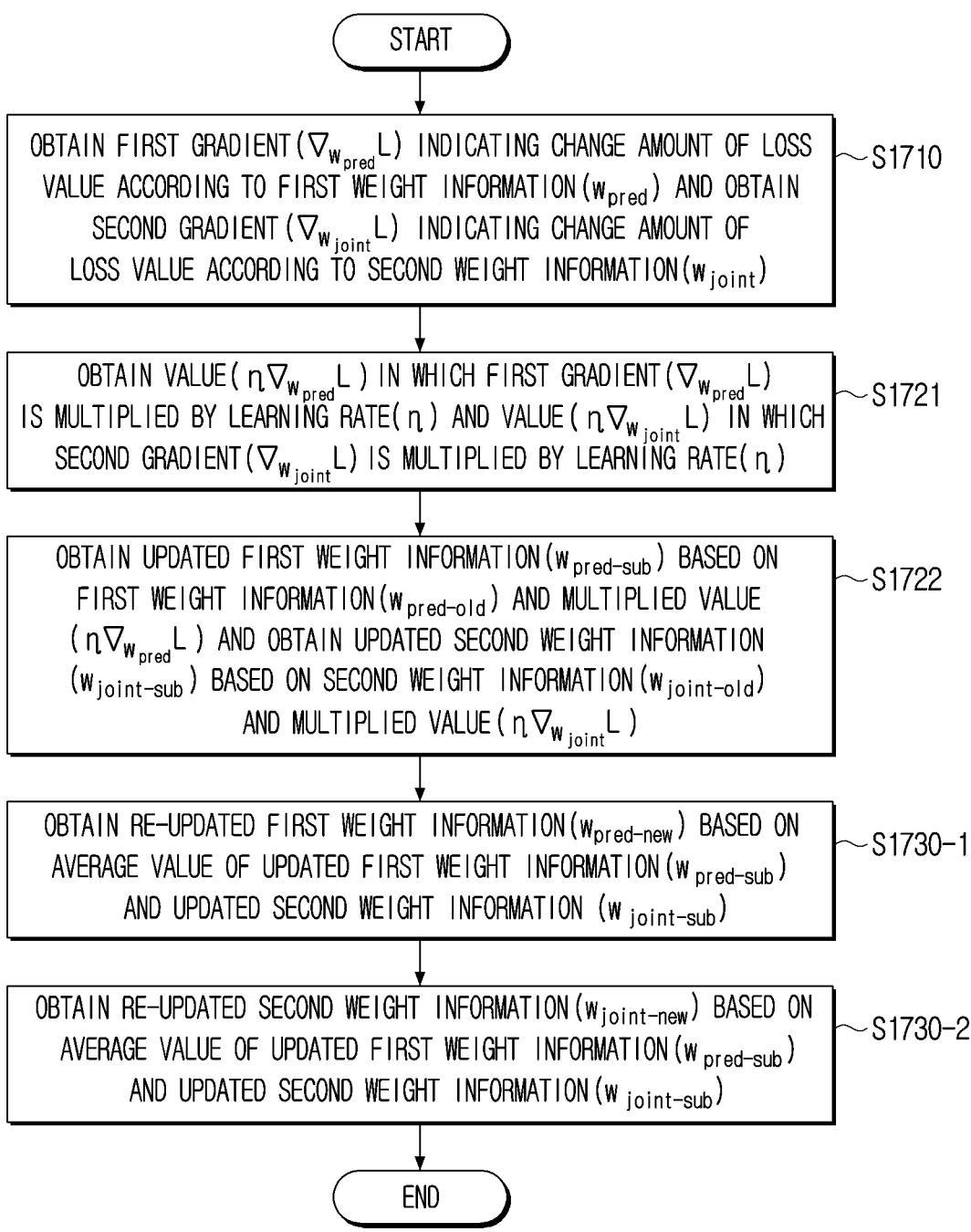
FIG. 17 is a flowchart illustrating an operation of learning first weight information and second weight information based on a learning method according to another embodiment of the disclosure.

Specific operations related to the foregoing are described in FIGS. 16 and 17. In FIG. 16, the first gradient is indicated by "$\nabla_{W\_pred}L$", the second gradient is indicated by "$\nabla_{W\_joint}L$", the learning rate is indicated by n, the first sub-weight information is indicated by "W_pred-sub", the second sub-weight information is indicated by "W_joint-sub", the first weight information before the learning operation is performed is indicated by "W_pred-old", the first weight information after the learning operation has been performed is indicated by "W_pred-new", the second weight information before the learning operation is performed is indicated by "W_joint-old", and the second weight information after the learning operation has been performed is indicated by "W_joint-new".

The electronic apparatus 100 may further include a microphone.

The microphone is an element to receive a user voice or other sound and convert to audio data. The microphone may receive the user voice in an active state. For example, the microphone may be integrally formed as an integral unit on at least one of an upper side, a front side direction, a side direction, or the like of the electronic apparatus 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The processor 120 may obtain user voice through the microphone. The processor 120 may obtain recognition information corresponding to the user voice from the speech recognition model 200.

The electronic apparatus 100 may obtain recognition information corresponding to the user voice by using the first weight information included in the second network 220 and the second weight information included in the third network 230. The weight included in the first weight information may be included in the second weight information. Since the second weight information may use the weight included in the first weight information as it is, some weights may be shared. Therefore, the electronic apparatus 100 may reduce the size of the model without the degradation of the speech recognition performance.

Although only a simple configuration of the electronic apparatus 100 is shown above, various configurations may be additionally provided during implementation.

In FIG. 2, as previously noted, the speech recognition model 200 may include a first network 210, a second network 220, and a third network 230.

The speech recognition model 200 may be an artificial intelligence model. For example, as previously noted, the speech recognition model 200 may be an RNN-T model.

The first network 210 may be a transcription network. The first network 210 may receive a user voice and obtain a first vector corresponding to the user voice.

The second network 220 may be a prediction network. The second network 220 may receive a previous output result to obtain a second vector. The previous output result may refer to recognition information (e.g. first recognition information) corresponding to a previous user voice. The second network 220 may obtain a second vector corresponding to a previous output result, using weight information (e.g. first weight information).

The third network 230 may be a joint network. The third network 230 may receive a first vector obtained from the first network 210 and a second vector obtained from the second network 220 to obtain an output result corresponding to the user voice. The output result may be a target word corresponding to the user voice.

FIG. 3 is a diagram illustrating the speech recognition model 200 for obtaining recognition information based on a previous output value, according to an embodiment of the disclosure.

Referring to FIG. 3, the speech recognition model 200 may include a first network 210, a second network 220, and a third network 230.

The first network 210 may obtain the user voice X_t. The first network 210 may obtain the first vector h_trans, t using Equation 211-1; namely, the first network 210 may input the received user voice X_t to a first sub-network f_trans to obtain the first vector h_trans,t. The first sub-network f_trans may be a network included in the first network 210.

The second network 220 may obtain recognition information y_u-1 corresponding to the previous user voice. The second network 220 may obtain the second vector h_pred,u using Equation 221-1 and Equation 222-1. Through Equation 221-1, the second network 220 may multiply the first weight information W_pred and the recognition information y_u-1 corresponding to the previous user voice to obtain the intermediate vector e_u-1. The intermediate vector e_u-1 may be an embedding vector. Through Equation 222-1, the second network 220 may input the intermediate vector e_u-1 to the second sub-network f_pred to obtain the second vector h_pred,u.

The third network 230 may obtain recognition information y_u corresponding to the user voice X_t. The recognition information y_u corresponding to the user voice X_t may refer to recognition information (or a target word) corresponding to the user voice. The third network 230 may obtain recognition information corresponding to the user voice by using Equation 231 and Equation 232. Through Equation 231, the third network 230 may input the first vector h_trans, t and the second vector h_pred,u to the third sub-network f_joint to obtain the third vector h_joint. Through Equation 232, the third network 230 may input the second weight information W_joint and the third vector h_joint to the softmax function to obtain recognition information y_u corresponding to the user voice. In Equation 232, p(y_u|X_t,y_u-1) indicates a probability value for recognition information y_u determined based on user voice (X_t) and recognition information y_u-1 corresponding to the previous user voice.

In FIG. 3, it is assumed that the recognition information corresponding to a previous user voice is singular; that is, there is only one previous user voice and only one set of recognition information corresponding to a previous user voice. However, the recognition information corresponding to a previous user voice may be plural, either as a result of more than one previous use voice or more than one set of recognition information corresponding to a previous user voice, and the description related thereto is illustrated in FIG. 4.

Figure 4:
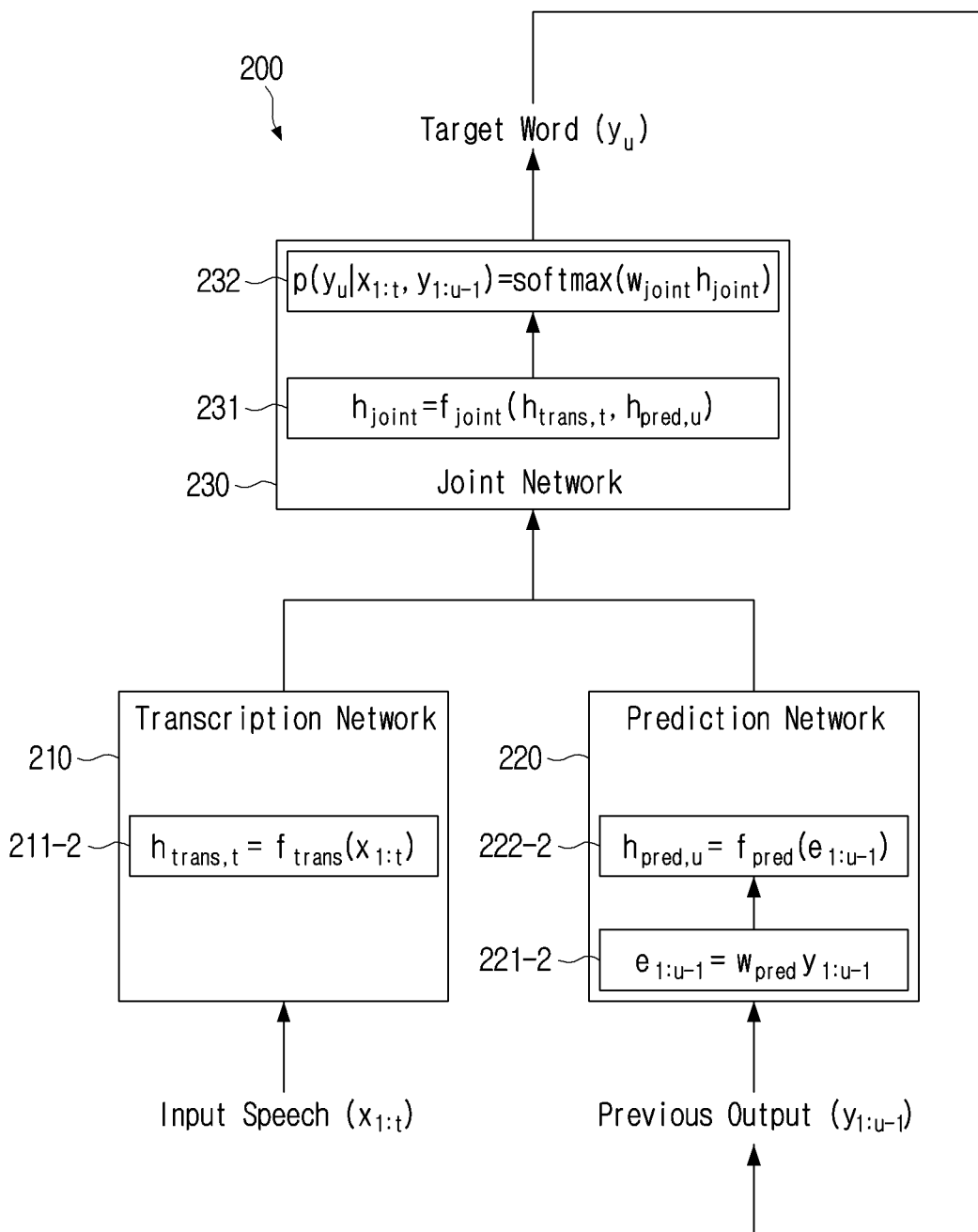
FIG. 4 is a diagram illustrating a speech recognition model for obtaining recognition information based on a plurality of previous output values, according to an embodiment of the disclosure.

FIG. 4 is a diagram illustrating the speech recognition model 200 for obtaining recognition information based on a plurality of previous output values, according to an embodiment of the disclosure.

Referring to FIG. 4, the speech recognition model 200 may include a first network 210, a second network 220, and a third network 230.

The first network 210 may obtain a user voice (X_1:t). The first network 210 may obtain the first vector h_trans, t using Equation 211-2. The first network 210 may input the received user voice (X_1:t) to the first sub-network f_trans to obtain the first vector h_trans,t. The first sub-network f_trans may be a network included in the first network 210.

The second network 220 may obtain recognition information y_1:u-1 corresponding to the previous user voice. The second network 220 may obtain the second vector h_pred,u using Equation 221-2 and Equation 222-2. Through Equation 221-2, the second network 220 may multiply the first weight information W_pred and the recognition information y_1:u-1 corresponding to the previous user voice to obtain the intermediate vector e_1:u-1. The intermediate vector e_1:u-1 may be an embedding vector. Through Equation 222-2, the second network 220 may input the intermediate vector e_1:u-1 to the second sub-network f_pred to obtain the second vector h_pred,u.

The third network 230 may obtain recognition information y_u corresponding to the user voice X_1:t. The recognition information y_u corresponding to the user voice X_1:t may refer to recognition information (or a target word) corresponding to the user voice. The third network 230 may obtain recognition information corresponding to the user voice by using Equation 231 and Equation 232. Through Equation 231, the third network 230 may input the first vector h_trans,t and the second vector h_pred,u to the third sub-network f_joint to obtain the third vector h_joint. Through Equation 232, the third network 230 may input the second weight information W_joint and the third vector h_joint to the softmax function to obtain recognition information y_u corresponding to the user voice. In Equation 232, p(y_u|X_1:t,y_1:u-1) indicates a probability value for recognition information y_u determined based on the user speech X_1:t and recognition information y_1:u-1 corresponding to the previous user voice.

Figure 5:
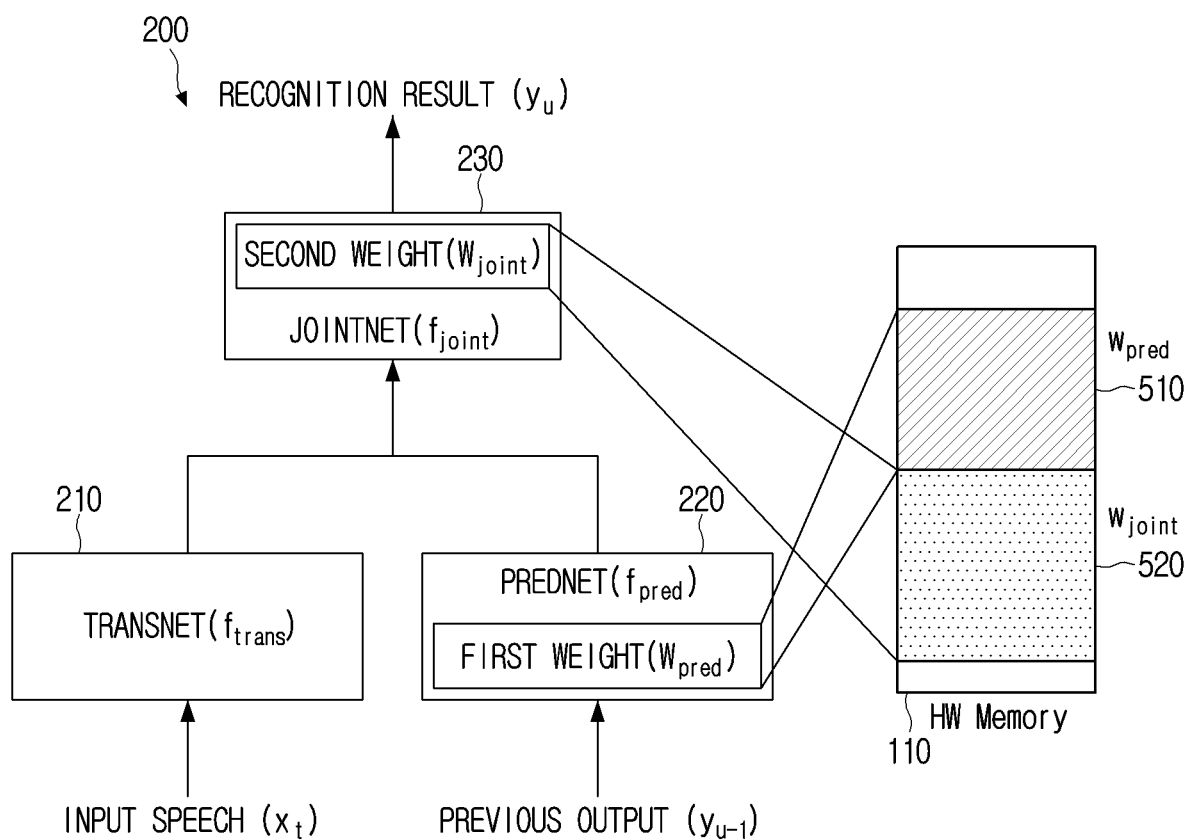
FIG. 5 is a diagram illustrating a weight information storage method in which the first weight information and the second weight information have no weights in common, according to an embodiment.

FIG. 5 is a diagram illustrating a weight information storage method in which the first weight information and the second weight information have no weights in common, according to an embodiment of the disclosure.

Referring to FIG. 5, the speech recognition model 200 may include a first network 210, a second network 220, and a third network 230. The second network 220 may use the first weight information W_pred. The third network 230 may use the second weight information W_joint. The first weight information W_pred and the second weight information W_joint may be stored in the memory 110 of the electronic apparatus 100.

The first weight information W_pred and the second weight information W_joint may include different weights. The electronic apparatus 100 may store the first weight information W_pred in the first area 510 of the memory 110 and may store the second weight information W_joint in the second area 520 of the memory 110.

Figure 6:
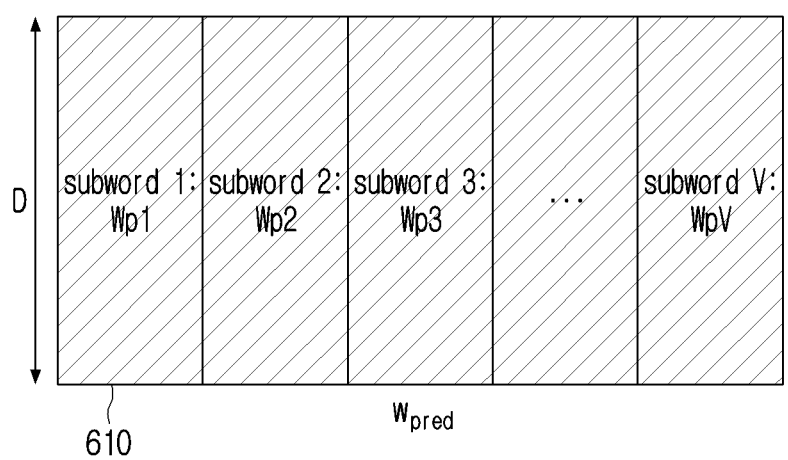
FIG. 6 is a diagram illustrating an example weight information configuration in which the first weight information and the second weight information have no weights in common, according to an embodiment of the disclosure.
Figure 6:
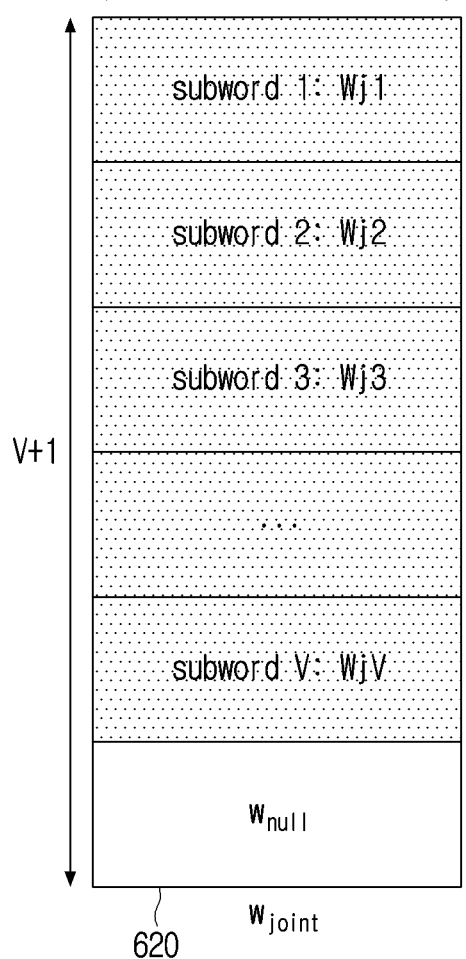

FIG. 6 is a diagram illustrating a weight information configuration in which the first weight information and the second weight information have no weights in common, according to an embodiment of the disclosure.

Referring to FIG. 6, the first weight information W_pred 610 and the second weight information W_joint 620 may include different weights.

The first weight information W_pred 610 may include V weight values of D dimension. Here, V may indicate a predetermined number of subwords, and D may indicate a predetermined dimension of a subword weight. The first weight information W_pred 610 may include a first subword weight W_p1, a second subword weight W_p2, a third subword weight W_p3, and so forth to a Vth subword weight W_pV.

The second weight information W_joint 620 may include V+1 weights of D dimension. Here, V may indicate a predetermined number of subwords, and D may indicate a predetermined dimension of a subword weight. The weights included in the second weight information W_joint 620 may include a first subword weight W_j1, a second subword weight W_j2, a third subword weight W_j3, and so forth to a Vth subword weight W_jV, and also an additional weight W_null. The additional weight W_null may be applied when the user's voice does not correspond to any of the V subwords. Accordingly, the second weight information W_joint 620 may include weights W_j1, W_j2, W_j3, . . . , W_jV corresponding to V subwords, and an additional weight W_null. The second weight information W_joint 620 may therefore include a total of V+1 weights.

Figure 7:
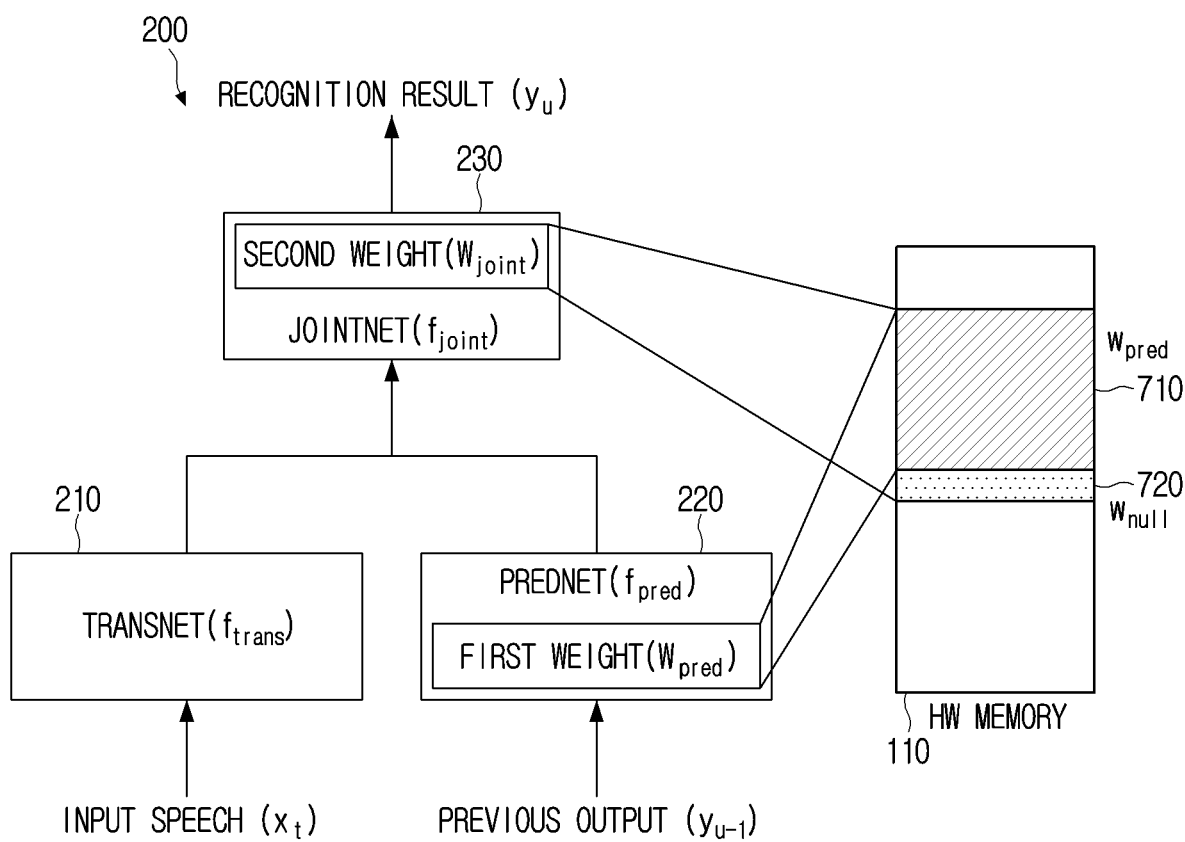
FIG. 7 is a diagram illustrating a weight information storage method in which the first weight information and the second weight information have weights in common, according to an embodiment of the disclosure.

FIG. 7 is a diagram illustrating a weight information storage method in which the first weight information and the second weight information have weights in common, according to an embodiment of the disclosure.

Referring to FIG. 7, the speech recognition model 200 may include a first network 210, a second network 220, and a third network 230. The second network 220 may use the first weight information W_pred. The third network 230 may use the second weight information (W_joint). The first weight information W_pred and the second weight information W_joint may be stored in the memory 110 of the electronic apparatus 100.

The first weight information W_pred and the second weight information W_joint may include weights in common. Therefore, the electronic apparatus 100 does not need to separately store the first weight information W_pred and the second weight information W_joint. The electronic apparatus 100 may use some or all of the weights included in the first weight information W_pred as part of the second weight information W_joint.

The electronic apparatus 100 may store one or more weights included in the first weight information W_pred in the first area 710 of the memory 110. The electronic apparatus 100 may store an additional weight W_null in the second area 720 of the memory 110.

The electronic apparatus 100 may use the weights stored in the first region 710 of the memory 110 as the first weight information W_pred. The electronic apparatus 100 may use the weights stored in the first area 710 of the memory 110 in combination with the weight W_null stored in the second area 720 of the memory 110 as the second weight information W_joint. As a result, the embodiment illustrated in FIG. 7 may reduce the storage space of the memory 110 in comparison to the embodiment illustrated in FIG. 5.

FIG. 8 is a diagram illustrating a weight information configuration of an embodiment in which the first weight information and the second weight information have weights in common, according to an embodiment of the disclosure.

Referring to FIG. 8, the first weight information W_pred 810 and the second weight information W_joint-new 820 may include weights in common.

The first weight information W_pred 810 may include V weight values of D dimension. Here, V may indicate a predetermined number of subwords, and D may indicate a predetermined dimension of a subword weight. The first weight information W_pred 810 may include a first subword weight W_p1, a second subword weight W_p2, a third subword weight W_p3, and so forth to a Vth subword weight W_pV.

The second weight information W_joint-new 820 may include V+1 weights of D dimension. Here, V may indicate a predetermined number of subwords, and D may indicate a predetermined dimension of a subword weight.

The second weight information W_joint-new 820 may include at least one weight included in the first weight information W_pred 810 and an additional weight W_null. The weight included in the second weight information W_joint-new 820 may include the first subword weight W_p1, the second subword weight W_p2, the third subword weight W_p3, and so forth to the Vth subword weight W_pV, and also an additional weight W_null. The additional weight W_null may be applied when the user's voice does not correspond to any of the V subwords. Accordingly, the second weight information W_joint-new 820 may include weights W_p1, W_p2, W_p3, . . . , W_pV corresponding to V subwords, and an additional weight W_null. The second weight information W_joint-new 820 may therefore include a total of V+1 weights.

The electronic apparatus 100 may obtain the second weight information W_joint-new 820 based on Equation 830. The electronic apparatus 100 may obtain a transposed matrix of the first weight information W_pred 810. The electronic apparatus 100 may obtain the second weight information W_joint-new 830 by adding an additional weight W_null to a transposed matrix of the first weight information W_pred 810.

Figure 9:
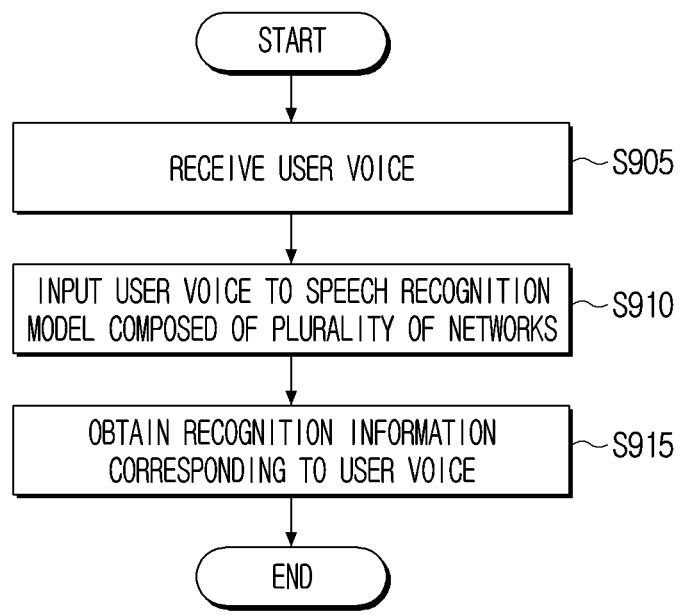
FIG. 9 is a flowchart illustrating an operation of obtaining recognition information corresponding to a user voice using a speech recognition model, according to an embodiment of the disclosure.

FIG. 9 is a flowchart illustrating an operation of obtaining recognition information corresponding to a user voice using the speech recognition model 200, according to an embodiment of the disclosure.

Referring to FIG. 9, the electronic apparatus 100 may receive a user voice in operation S905. The electronic apparatus 100 may input at least one audio signal representing a user voice into a speech recognition model 200 including a plurality of networks in operation S910. The electronic apparatus 100 may obtain recognition information corresponding to the user voice from the speech recognition model 200 in operation S915. The recognition information corresponding to the user voice may be output from the speech recognition model 200. The user voice is input data input to the speech recognition model 200, and recognition information corresponding to the user voice may be output data output from the speech recognition model 200.

Figure 10:
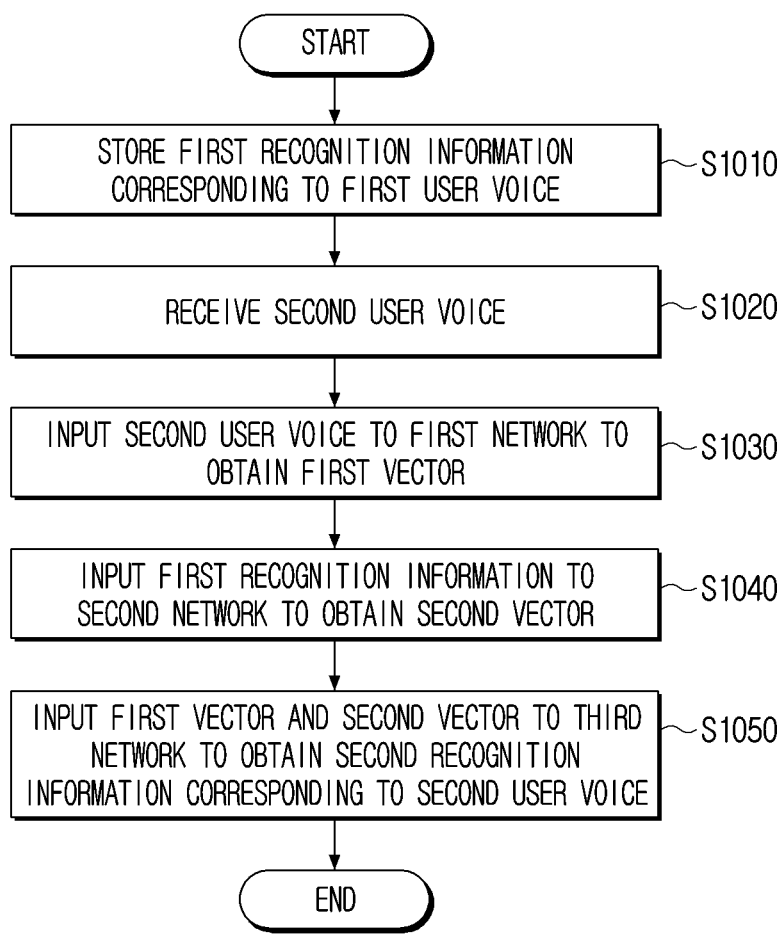
FIG. 10 is a flowchart illustrating an operation of obtaining recognition information based on a first user voice and a second user voice, according to an embodiment of the disclosure.

FIG. 10 is a flowchart illustrating an operation of obtaining recognition information based on a first user voice and a second user voice, according to an embodiment of the disclosure.

Referring to FIG. 10, the electronic apparatus 100 may store first recognition information corresponding to the first user voice in operation S1010. The electronic apparatus 100 may input at least one audio signal representing the first user voice to the speech recognition model 200 to obtain first recognition information corresponding to the first user voice as output data. The electronic apparatus 100 may store the first recognition information in the memory 110.

The electronic apparatus 100 may receive the second user voice in operation S1020. The electronic apparatus 100 may input at least one audio signal representing the second user voice to the first network 210 to obtain the first vector in operation S1030. The operation of obtaining the first vector may be performed in the first network 210.

The electronic apparatus 100 may input the first recognition information to the second network 220 to obtain a second vector in operation S1040. The operation of obtaining the second vector may be performed in the second network 220.

In operation S1050, the electronic apparatus 100 may input the first vector and the second vector to the third network 230 to obtain second recognition information corresponding to the second user voice in operation S1050. The operation of obtaining the second recognition information may be performed in the third network 230.

Figure 11:
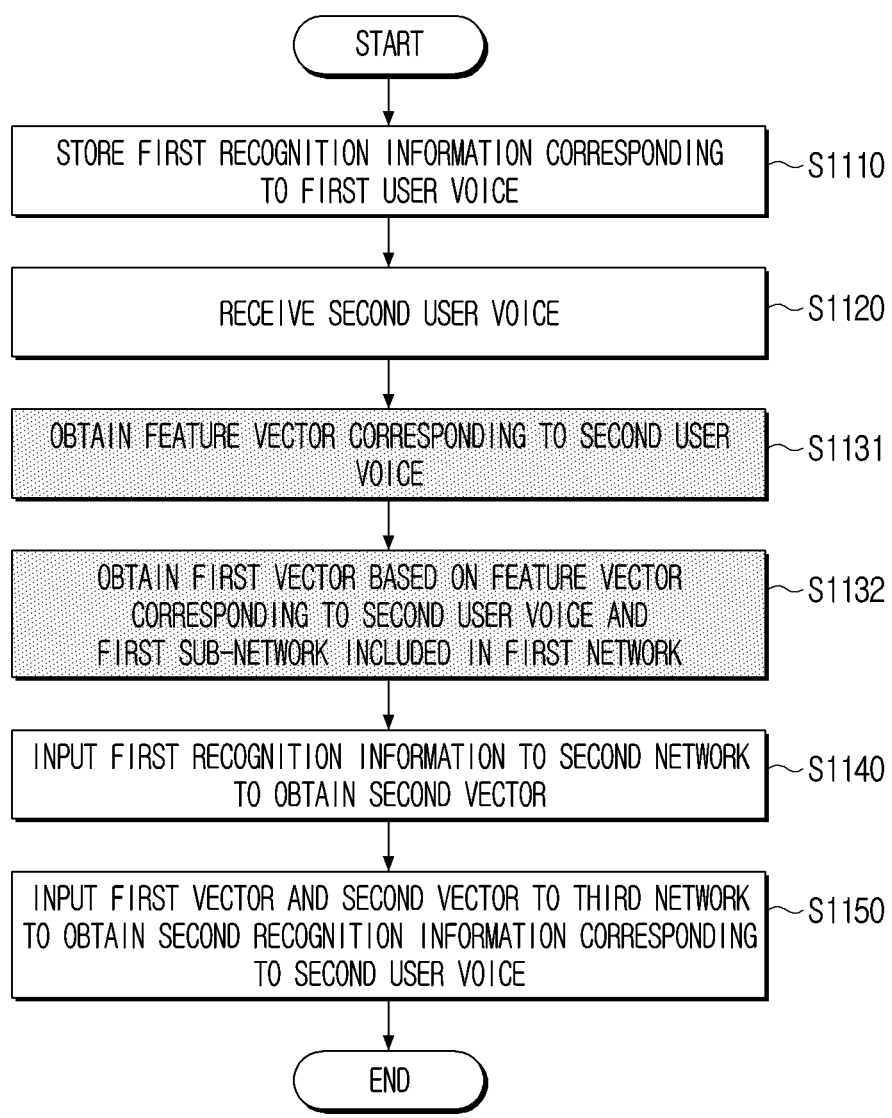
FIG. 11 is a flowchart illustrating a detailed operation of obtaining a first vector, according to an embodiment of the disclosure.

FIG. 11 is a flowchart illustrating a detailed operation of obtaining a first vector, according to an embodiment of the disclosure.

Referring to FIG. 11, the operations S1110, S1120, S1140, and S1150 may correspond to S1010, S1020, S1040, and S1050 of FIG. 10 and will not be described further.

After operation S1120 of receiving the second user voice, the electronic apparatus 100 may obtain a feature vector corresponding to the second user voice in operation S1131. The feature vector may be generated based on a user voice. The electronic apparatus 100 may obtain a first vector h_trans,t based on a feature vector corresponding to a second user voice and a first sub-network f_trans included in the first network 210 in operation S1132.

Figure 12:
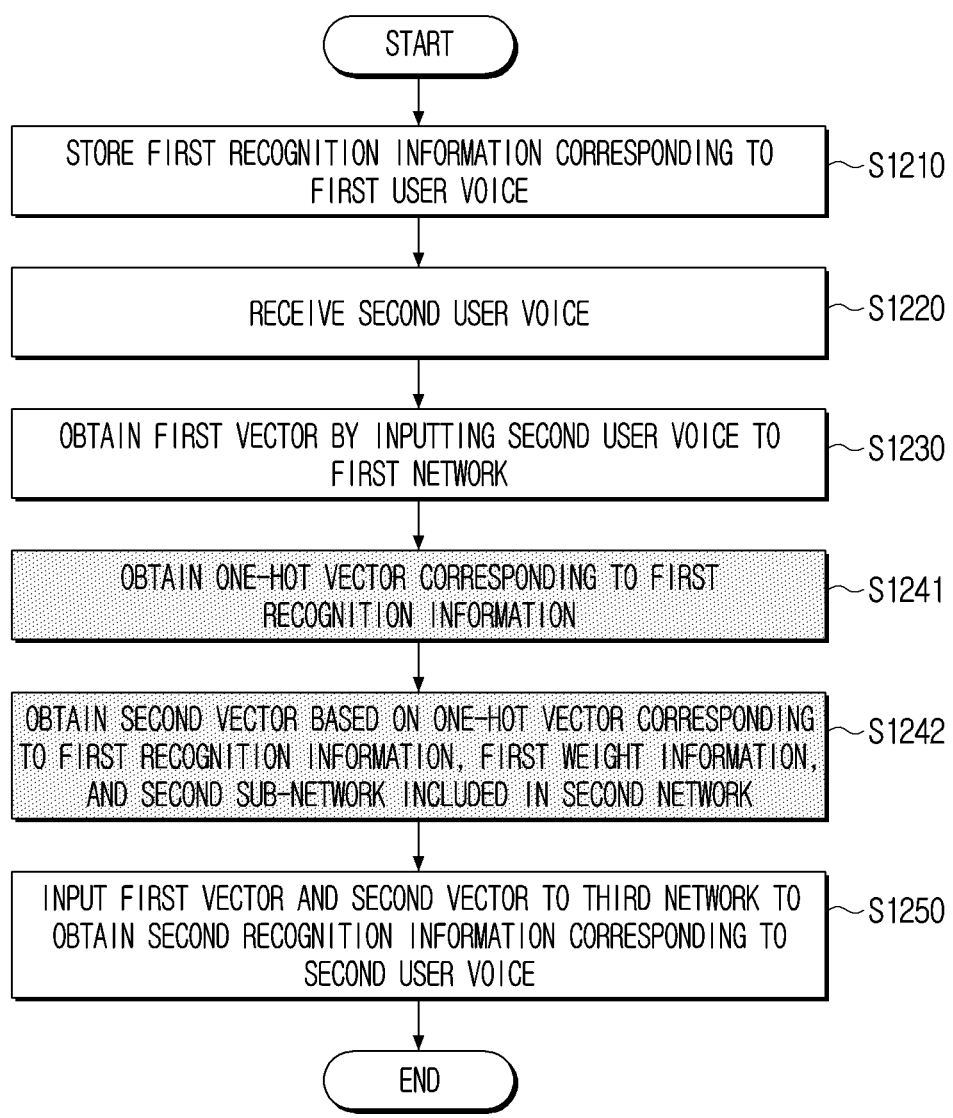
FIG. 12 is a flowchart illustrating a detailed operation of obtaining a second vector, according to an embodiment of the disclosure.

FIG. 12 is a flowchart illustrating a detailed operation of obtaining a second vector, according to an embodiment of the disclosure.

Referring to FIG. 12, the operations S1210, S1220, S1230, and S1250 may correspond to S1010, S1020, S1030, and S1050 of FIG. 10 and will not be described further.

In operation S1241, the electronic apparatus 100 may obtain a one-hot vector corresponding to the first recognition information after obtaining the first vector in operation S1230.

The electronic apparatus 100 may obtain the second vector h_pred,u based on a one-hot vector corresponding to the first recognition information, the first weight information W_pred, and the second sub-network f_pred included in the second network 220 in operation S1242.

Figure 13:
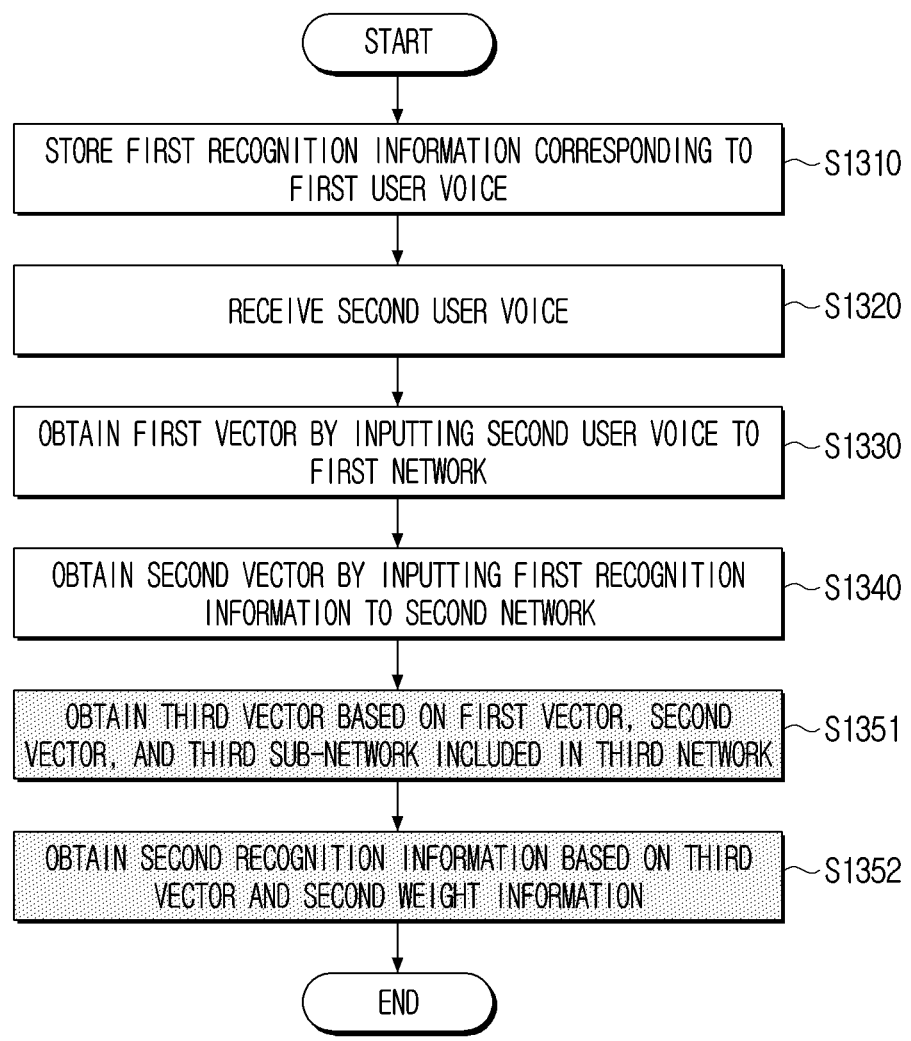
FIG. 13 is a flowchart illustrating a detailed operation of obtaining a third vector, according to an embodiment of the disclosure.

FIG. 13 is a flowchart illustrating a detailed operation of obtaining a third vector, according to an embodiment of the disclosure.

Referring to FIG. 13, the operations S1310, S1320, S1330, and S1340 may correspond to S1010, S1020, S1030, and S1040 of FIG. 10 and will not be described further.

In operation S1352, the electronic apparatus 100 may obtain the third vector h_joint based on the third sub-network f_joint included in the first vector, second vector, and the third network 230 after the obtaining the second vector in operation S1340.

FIG. 14 is a diagram illustrating an operation of learning first weight information and second weight information based on a learning method, according to an embodiment of the disclosure.

Referring to FIG. 14, according to an embodiment, the electronic apparatus 100 may learn the first weight information W_pred and the second weight information W_joint.

The electronic apparatus 100 may obtain a first gradient $\nabla_{W\_pred}L$ indicating a change amount of a loss value according to the first weight information W_pred in operation S1410-1. The electronic apparatus 100 may obtain a second gradient $\nabla_{W\_joint}L$ indicating the amount of change in the loss value according to the second weight information W_joint in operation S1410-2.

Here, L may indicate a loss value obtained based on a loss function.

Each gradient may be represented as a gradient vector. The first gradient $\nabla_{W\_pred}L$ may be a gradient vector indicating how much a loss value is changed as the first weight information W_pred changes. The second gradient $\nabla_{W\_joint}L$ may be a gradient vector indicating how much a loss value is changed as the second weight information W_joint changes.

The electronic apparatus 100 may obtain the updated first weight information W_pred-new in operation S1420. The electronic apparatus 100 may obtain the updated first weight information W_pred-new based on the first weight information W_pred-old, learning rate η, the first gradient $\nabla_{W\_pred}L$ obtained in operation S1410-1, and the second gradient $\nabla_{W\_joint}L$ obtained in operation S1410-2. The electronic apparatus 100 may obtain a sum value $\nabla_{W\_pred}L+\nabla_{W\_joint}L$ of the first gradient $\nabla_{W\_pred}L$ and the second gradient $\nabla_{W\_joint}L$, and multiply the obtained sum value by a learning rate η to obtain an intermediate value $\eta(\nabla_{W\_pred}L+\nabla_{W\_joint}L)$. The electronic apparatus 100 may deduct intermediate value $\eta(\nabla_{W\_pred}L+\nabla_{W\_joint}L)$ from the first weight information W_pred-old to obtain the updated first weight information W_pred-new.

The electronic apparatus 100 may obtain the updated second weight information W_joint-new in operation S1430. The electronic apparatus 100 may obtain the updated second weight information W_joint-new by substituting the updated first weight information W_pred-new to replace the second weight information W_joint-old. Here, operation S1430 may correspond to Equation 830 of FIG. 8.

The updated first weight information W_pred-new and the updated second weight information W_joint-new may include the same weight. The updated second weight information W_joint-new may further include an additional weight W_null than the first weight information W_pred-new.

FIG. 15 is a flowchart illustrating an operation of learning first weight information and second weight information based on a learning method according to an embodiment of the disclosure.

Referring to FIG. 15, the electronic apparatus 100 may obtain a first gradient $\nabla_{W\_pred}L$ indicating a change amount of a loss value according to the first weight information W_pred, and obtain a second gradient $\nabla_{W\_joint}L$ indicating a change amount of a loss value according to the second weight information W_joint in operation S1510. Here, the step S1510 may correspond to steps S1410-1 and S1410-2 of FIG. 14.

The electronic apparatus 100 may obtain the value $\nabla_{W\_pred}L+\nabla_{W\_joint}L$ in which the first gradient $\nabla_{W\_pred}L$ and the second gradient $\nabla_{W\_joint}L$ are added in operation S1521.

In operation S1522, the electronic apparatus 100 may obtain a value $\eta(\nabla_{W\_pred}L+\nabla_{W\_joint}L)$ obtained by multiplying the learning rate η by the added value $\nabla_{W\_pred}L+\nabla_{W\_joint}L$ in operation S1521. In operation S1523, the electronic apparatus 100 may obtain the updated first weight information W_pred-new based on the first weight information W_pred-old and the value $\eta(\nabla_{W\_pred}L+\nabla_{W\_joint}L)$ obtained in operation S1522. Here, operations S1521, S1522, and S1523 may correspond to operation S1420 of FIG. 14.

The electronic apparatus 100 may obtain updated second weight information W_joint-new based on the updated first weight information W_pred-new in operation S1530. The updated second weight information W_joint-new may include a weight included in the updated first weight information W_pred-new and an additional weight W_null. Here, operation S1530 may correspond to S1430 of FIG. 14.

FIG. 16 is a diagram illustrating an operation of learning first weight information and second weight information based on a learning method according to another embodiment of the disclosure.

Referring to FIG. 16, according to another embodiment, the electronic apparatus 100 may learn the first weight information W_pred and the second weight information W_joint.

The electronic apparatus 100 may obtain a first gradient $\nabla_{W\_pred}L$ indicating a change amount of a loss value according to the first weight information W_pred in operation S1610-1. The electronic apparatus 100 may obtain a second gradient $\nabla_{W\_joint}L$ indicating the amount of change in the loss value according to the second weight information W_joint-old in operation S1610-2.

The electronic apparatus 100 may obtain the first sub-weight information W_pred-sub in operation S1620-1. The electronic apparatus 100 may obtain a value $\eta\nabla_{W\_pred}L$ obtained by multiplying the learning rate η by the first gradient $\nabla_{W\_pred}L$. The electronic apparatus 100 may obtain the first sub-weight information W_pred-sub by subtracting the value $\eta\nabla_{W\_pred}L$ from the first weight information W_pred-old.

The electronic apparatus 100 may obtain the second sub-weight information W_joint-sub in operation S1620-2. Specifically, the electronic apparatus 100 may obtain a value $\eta\nabla_{W\_joint}L$ obtained by multiplying a learning rate η by a second gradient $\nabla_{W\_joint}L$. The electronic apparatus 100 may obtain the second sub-weight information W_joint-sub by subtracting the value $\eta\nabla_{W\_joint}L$ from the second weight information W_joint-old.

The electronic apparatus 100 may obtain the updated first weight information W_pred-new based on the first sub-weight information W_pred-sub and the second sub-weight information W_joint-sub in operation S1630-1. The electronic apparatus 100 may obtain an average value of the first sub-weight information W_pred-sub and the second sub-weight information W_joint-sub as the updated first weight information W_pred-new.

The electronic apparatus 100 may obtain updated second weight information W_joint-new based on the first sub-weight information W_pred-sub and the second sub-weight information W_joint-sub in operation S1630-2. The electronic apparatus 100 may obtain an average value of the first sub-weight information W_pred-sub and the second sub-weight information W_joint-sub as the updated second weight information W_joint-new.

The updated first weight information W_pred-new and the updated second weight information W_joint-new may include the same weight. The updated second weight information W_joint-new may further include an additional weight W_null than the first weight information W_pred-new.

FIG. 17 is a flowchart illustrating an operation of learning first weight information and second weight information based on a learning method according to another embodiment of the disclosure.

Referring to FIG. 17, the electronic apparatus 100 may obtain a first gradient $\nabla_{W\_pred}L$ indicating a change amount of a loss value according to the first weight information W_pred, and obtain a second gradient $\nabla_{W\_joint}L$ indicating a change amount of a loss value according to the second weight information W_joint in operation S1710. The operation S1710 may correspond to operations S1610-1 and S 1610-2 of FIG. 16.

The electronic apparatus 100 may obtain a value $\eta\nabla_{W\_pred}L$ obtained by multiplying the learning rate $\eta$ by the first gradient $\nabla_{W\_pred}L$ and obtain a value $\eta\nabla_{W\_joint}L$ obtained by multiplying the learning rate $\eta$ by the second gradient $\nabla_{W\_joint}L$ in operation S1721.

The electronic apparatus 100 may obtain the first sub-weight information W_pred-sub based on the first weight information W_pred-old and the value $\eta\nabla_{W\_pred}L$, and may obtain the second sub-weight information W_joint-sub based on the second weight information W_joint-old and the value $\eta\nabla_{W\_joint}L$ in operation S1722. Here, operations S1721 and S1722 may correspond to operations S1620-1 and S1620-2 of FIG. 16.

The electronic apparatus 100 may obtain the updated first weight information W_predn-new based on the average value of the first sub-weight information W_pred-sub and the second sub-weight information W_joint-sub in operation S1730-1.

The electronic apparatus 100 may obtain updated second weight information W_joint-new based on the average value of the first sub-weight information W_pred-sub and the second sub-weight information W_joint-sub in operation S1730-2. Here, the operations S1730-1 and S1730-2 may obtain the operations S1630-1 and S1630-2 of FIG. 16.

Figure 18:
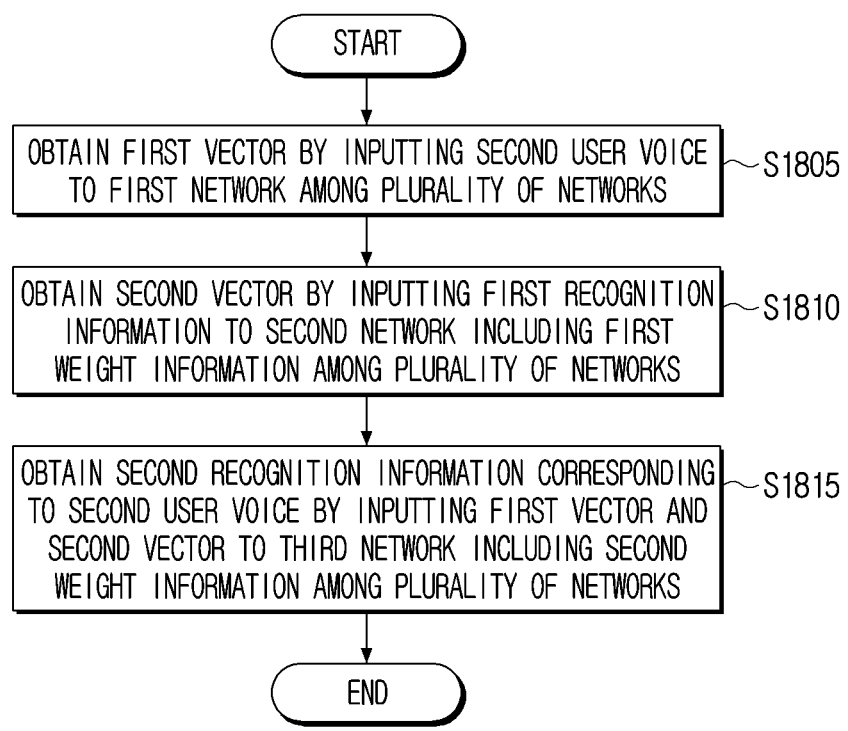
FIG. 18 is a flowchart illustrating a method of controlling an electronic apparatus, according to an embodiment of the disclosure.

FIG. 18 is a flowchart illustrating a method of controlling the electronic apparatus 100 according to an embodiment of the disclosure.

Referring to FIG. 18, a method of controlling the electronic apparatus 100 storing a speech recognition model composed of a plurality of networks and first recognition information corresponding to a first user voice obtained through the speech recognition model may include obtaining a first vector by inputting a second user voice to a first network among the plurality of networks in operation S1805; obtaining a second vector by inputting the first recognition information to a second network including first weight information among the plurality of networks in operation S1810; and obtaining second recognition information corresponding to the second user voice by inputting the first vector and the second vector to a third network including second weight information among the plurality of networks in operation S1815, and at least a part of the second weight information may be information identical with the first weight information. The speech recognition model may be a recurrent neural network transducer (RNN-T) model.

The first network may be a transcription network, the second network may be a prediction network, and the third network may be a joint network.

The obtaining the first vector in operation S1805 may include, based on receiving the second user voice, obtaining a feature vector corresponding to the second user voice, and obtaining the first vector based on the feature vector corresponding to the second user voice and a first sub-network included in the first network.

The obtaining the second vector in operation S1810 may include obtaining a one-hot vector corresponding to the first recognition information, and obtaining the second vector based on the one-hot vector corresponding to the first recognition information, the first weight information, and a second sub-network included in the second network.

The obtaining the second recognition information in operation S1815 may include obtaining a third vector based on the first vector, the second vector, and a third sub-network included in the third network, and obtaining the second recognition information based on a third vector and the second weight information.

The first weight information may include a weight corresponding to a preset number of subwords, and the second weight information may include the weight included in the first weight information and an additional weight.

The additional weight may be a weight used when there is no subword corresponding to the second user voice, and a dimension of the preset number of weights may be identical with a dimension of the additional weight.

The first weight information may be trained based on a first gradient indicating a change amount of a loss value according to the first weight information, a second gradient indicating a change amount of a loss value according to the second weight information, and a learning rate, and the second weight information may be determined based on the trained first weight information.

The first weight information and the second weight information may be trained based on an average value of the first sub-weight information and the second sub-weight information, the first sub-weight may be calculated based on the first gradient indicating a change amount of a loss value according to the first weight information and a learning rate, and the second sub-weight may be calculated based on the second gradient indicating a change amount of a loss value according to the second weight information and the learning rate.

The method for controlling an electronic apparatus as shown in FIG. 18 may be performed on an electronic apparatus having the configuration of FIG. 1, among other suitable configurations.

The methods according to the various embodiments as described above may be implemented as an application format installable in an existing electronic apparatus.

The methods according to the various embodiments as described above may be implemented as software upgrade or hardware upgrade for an existing electronic apparatus.

The various embodiments described above may be performed through an embedded server provided in an electronic apparatus, or an external server of at least one electronic apparatus and a display device.

Various embodiments may be implemented in software, including instructions stored on machine-readable storage media readable by a machine (e.g., a computer). An apparatus may call instructions from the storage medium, and execute the called instruction, including an electronic apparatus according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium is tangible, and does not distinguish the case in which a data is semi-permanently stored in a storage medium from the case in which a data is temporarily stored in a storage medium.

According to an embodiment, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

According to embodiments, the respective elements (e.g., module or program) mentioned above may include a single entity or a plurality of entities. According to embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. An electronic apparatus comprising:
a memory storing a speech recognition model and first recognition information corresponding to a first user voice obtained through the speech recognition model, the speech recognition model including a first network, a second network, and a third network; and
a processor configured to:
obtain a first vector by inputting voice data corresponding to a second user voice to the first network,
obtain a second vector by inputting the first recognition information to the second network which generates a vector based on first weight information, and
obtain second recognition information corresponding to the second user voice by inputting the first vector and the second vector to the third network which generates recognition information based on second weight information,
wherein at least a part of the second weight information is the same as the first weight information.

2. The electronic apparatus of claim 1, wherein the speech recognition model is a recurrent neural network transducer (RNN-T) model.

3. The electronic apparatus of claim 2, wherein the first network is a transcription network, the second network is a prediction network, and the third network is a joint network.

4. The electronic apparatus of claim 1, wherein the processor is further configured to, based on receiving the second user voice, obtain a feature vector corresponding to the second user voice, and
wherein a first sub-network included in the first network generates the first vector based on the feature vector.

5. The electronic apparatus of claim 1, wherein the processor is further configured to obtain a one-hot vector corresponding to the first recognition information, and
wherein a second sub-network included in the second network generates the second vector based on the one-hot vector and the first weight information.

6. The electronic apparatus of claim 1, wherein a third sub-network included in the third network generates a third vector based on the first vector and the second vector, and
wherein the third network generates the second recognition information based on the third vector and the second weight information.

7. The electronic apparatus of claim 1, wherein the first weight information includes at least one first weight corresponding to a preset number of subwords,
wherein the second weight information includes the at least one first weight and at least one additional weight,
wherein the at least one first weight is stored in a first area of the memory, and the at least one additional weight is stored in a second area of the memory, and
wherein the processor is further configured to use the at least one first weight stored in the first area and the at least one additional weight stored in the second area as the second weight information.

8. The electronic apparatus of claim 7, wherein the at least one additional weight is a weight used when no subword of the preset number of subwords corresponds to the second user voice, and
wherein a dimension of the at least one first weight corresponds to a dimension of the at least one additional weight.

9. The electronic apparatus of claim 1, wherein the first weight information is trained based on a first gradient indicating a change amount of a loss value according to the first weight information, a second gradient indicating a change amount of a loss value according to the second weight information, and a learning rate, and
wherein the second weight information is determined based on the trained first weight information.

10. The electronic apparatus of claim 1, wherein each of the first weight information and the second weight information are trained based on an average value of first sub-weight information and second sub-weight information,
wherein the first sub-weight information is determined based on a first gradient indicating a change amount of a loss value according to the first weight information and a learning rate, and
wherein the second sub-weight information is determined based on a second gradient indicating a change amount of a loss value according to the second weight information and the learning rate.

11. A method of controlling an electronic apparatus storing a speech recognition model and first recognition information corresponding to a first user voice obtained through the speech recognition model, the speech recognition model including a first network, a second network, and a third network, the method comprising:
obtaining a first vector by inputting voice data corresponding to a second user voice to the first network;
obtaining a second vector by inputting the first recognition information to the second network which generates a vector based on first weight information; and
obtaining second recognition information corresponding to the second user voice by inputting the first vector and the second vector to the third network which generates recognition information based on second weight information,
wherein at least a part of the second weight information is a same as the first weight information.

12. The method of claim 11, wherein the speech recognition model is a recurrent neural network transducer (RNN-T) model.

13. The method of claim 12, wherein the first network is a transcription network, the second network is a prediction network, and the third network is a joint network.

14. The method of claim 11, wherein the obtaining the first vector comprises, based on receiving the second user voice, obtaining a feature vector corresponding to the second user voice, and
wherein a first sub-network included in the first network generates the first vector based on the feature vector.

15. The method of claim 11, wherein the obtaining the second vector comprises obtaining a one-hot vector corresponding to the first recognition information, and
wherein a second sub-network included in the second network generates the second vector based on the one-hot vector and the first weight information.

* * * * *